United States Patent
Shinohara

(10) Patent No.: US 7,623,297 B2
(45) Date of Patent: Nov. 24, 2009

(54) ZOOM LENS

(75) Inventor: Yoshikazu Shinohara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/025,593

(22) Filed: Feb. 4, 2008

(65) Prior Publication Data

US 2008/0198484 A1  Aug. 21, 2008

(30) Foreign Application Priority Data

Feb. 16, 2007  (JP)  ............... P2007-035642

(51) Int. Cl.
*G02B 15/14*  (2006.01)
(52) U.S. Cl. ................... 359/680; 359/676
(58) Field of Classification Search ............ 359/676, 359/680–682, 684, 678
See application file for complete search history.

(56) References Cited

U.S. PATENT DOCUMENTS

| | | | | |
|---|---|---|---|---|
| 4,249,798 A * | 2/1981 | Moskovich | .............. | 359/683 |
| 5,999,329 A | 12/1999 | Ohtake | | |
| 7,068,441 B2 * | 6/2006 | Kim | .............. | 359/686 |
| 7,079,328 B2 | 7/2006 | Kuba et al. | | |

| | | |
|---|---|---|
| 2006/0268426 A1 | 11/2006 | Arimoto et al. |

FOREIGN PATENT DOCUMENTS

| | | |
|---|---|---|
| JP | 2000-131610 A | 5/2000 |
| JP | 2004-205796 A | 7/2004 |
| JP | 2005-173311 A | 6/2005 |
| JP | 2005-173313 A | 6/2005 |
| JP | 2007-33476 A | 2/2007 |
| WO | WO-2004/044638 A1 | 5/2004 |
| WO | WO-2007/009632 A1 | 1/2007 |

* cited by examiner

*Primary Examiner*—Scott J Sugarman
*Assistant Examiner*—James R Greece
(74) *Attorney, Agent, or Firm*—Birch, Stewart, Kolasch & Birch, LLP

(57) ABSTRACT

A zoom lens includes, in order from an object side, a first lens group fixed upon zooming and wholly having a negative refractive power, a second lens group formed by an optical-path bending prism fixed upon zooming and, a third lens group allowed to move upon zooming and wholly having a positive refractive power, a fourth lens group allowed to move upon zooming and wholly having a negative refractive power, and a fifth lens group fixed upon zooming and wholly having a positive refractive power. By arranging a zooming group having the positive third and negative fourth lens groups without arranging a positive fixed lens group in back of the prism, the overall length can be easily reduced as compared to the structure arranging a fixed lens group between a prism and a zooming group.

14 Claims, 23 Drawing Sheets

EMBODIMENT 1

EMBODIMENT 1

EMBODIMENT 2

EMBODIMENT 3

EMBODIMENT 4

EMBODIMENT 5

EMBODIMENT 6

EMBODIMENT 7

FIG. 9A

EMBODIMENT 1: LENS DATA

| | Si (SURFACE NUMBER) | Ri (CURVATURE RADIUS) | Di (SURFACE SEPARATION) | Ndi (REFRACTIVE INDEX) | $\nu$dj (ABBE NUMBER) | K | \multicolumn{4}{c}{ASPHERICAL COEFFICIENT} |
|---|---|---|---|---|---|---|---|---|---|---|
| | | | | | | | A4 | A6 | A8 | A10 |
| G1 { | 1 (ASP) | -10.248 | 0.750 | 1.469 | 77.8 | 0 | 1.52E-03 | -2.29E-05 | -8.45E-08 | 1.31E-08 |
| | 2 (ASP) | 8.667 | 1.181 | 1.000 | | 0 | 1.30E-03 | 1.96E-05 | -1.77E-06 | 1.03E-07 |
| G2 { | 3 | ∞ | 5.800 | 1.839 | 42.7 | 0 | | | | |
| | 4 | ∞ | D4 (VARIABLE) | 1.000 | | 0 | | | | |
| G3 { | 5 (ASP) | 3.797 | 2.155 | 1.517 | 63.3 | 0 | 3.17E-05 | 3.29E-04 | -5.61E-05 | 1.01E-05 |
| | 6 (ASP) | -21.727 | 0.998 | 1.000 | | 0 | 3.74E-03 | 7.73E-04 | -2.07E-04 | 4.24E-05 |
| | 7 (DIAPHRAGM) | ∞ | D7 (VARIABLE) | 1.000 | | 0 | | | | |
| G4 { | 8 | 13.848 | 1.873 | 1.716 | 53.9 | 0 | | | | |
| | 9 | -3.038 | 0.600 | 1.812 | 33.3 | 0 | | | | |
| | 10 | -8.330 | 0.433 | 1.000 | | 0 | | | | |
| | 11 | -5.583 | 0.600 | 1.704 | 30.1 | 0 | | | | |
| | 12 | 3.670 | D12 (VARIABLE) | 1.000 | | 0 | | | | |
| G5 { | 13 (ASP) | 31.571 | 2.500 | 1.688 | 31.3 | 0 | -1.81E-03 | 1.87E-04 | -2.03E-05 | 7.51E-07 |
| | 14 (ASP) | -5.310 | 0.400 | 1.000 | | 0 | -4.01E-04 | 2.44E-04 | -2.13E-05 | 6.69E-07 |
| G6 { | 15 | ∞ | 0.400 | 1.519 | 64.2 | 0 | | | | |
| | 16 | ∞ | 1.713 | 1.000 | | 0 | | | | |

(ASP: ASPHERIC SURFACE)

FIG. 9B

EMBODIMENT 1: SURFACE SEPARATION DATA OF VARIABLE SURFACE

| SURFACE SEPARATION | WIDE END | TELEPHOTO END |
|---|---|---|
| D4 | 7.894 | 0.599 |
| D7 | 0.462 | 1.603 |
| D12 | 1.378 | 7.531 |

FIG. 10A

EMBODIMENT 2: LENS DATA

| | Si (SURFACE NUMBER) | Ri (CURVATURE RADIUS) | Di (SURFACE SEPARATION) | Ndi (REFRACTIVE INDEX) | νdj (ABBE NUMBERS) | K | A4 | A6 | A8 | A10 | A12 |
|---|---|---|---|---|---|---|---|---|---|---|---|
| G1 | 1 (ASP) | −14.963 | 0.650 | 1.588 | 59.8 | −23.51396 | 4.55E−04 | −1.90E−05 | 4.57E−07 | −2.93E−09 | 0.00E+00 |
| | 2 (ASP) | 17.349 | 1.215 | 1.000 | | 9.377259 | 1.18E−03 | −3.77E−05 | 5.50E−07 | 3.48E−09 | 0.00E+00 |
| G2 | 3 | ∞ | 7.400 | 1.835 | 42.3 | 0 | | | | | |
| | 4 | ∞ | D4 (VARIABLE) | 1.000 | | 0 | | | | | |
| G3 | 5 | 12.055 | 0.981 | 1.744 | 44.4 | 0 | | | | | |
| | 6 | −52.008 | 0.151 | 1.000 | | 0 | | | | | |
| | 7 | 5.953 | 1.037 | 1.603 | 64.8 | 0 | | | | | |
| | 8 | 27.493 | 0.513 | 1.000 | | 0 | | | | | |
| | 9 (DIAPHRAGM) | ∞ | D9 (VARIABLE) | 1.000 | | 0 | | | | | |
| G4 | 10 | 4.379 | 1.099 | 1.603 | 64.8 | 0 | | | | | |
| | 11 | ∞ | 0.655 | 1.755 | 27.2 | 0 | | | | | |
| | 12 | 3.031 | 2.551 | 1.000 | | 0 | | | | | |
| | 13 | −4.163 | 0.651 | 1.803 | 40.0 | 0 | | | | | |
| | 14 (ASP) | −13.873 | D14 (VARIABLE) | 1.000 | | −51.0027 | 5.76E−05 | 3.31E−04 | −3.41E−05 | 3.58E−06 | −2.76E−08 |
| G5 | 15 (ASP) | 12.406 | 3.648 | 1.647 | 34.1 | 2.957054 | −5.42E−04 | 2.51E−05 | −1.31E−06 | 2.04E−08 | 0.00E+00 |
| | 16 (ASP) | −6.300 | 1.251 | 1.000 | | −5.273951 | −9.63E−04 | 7.45E−05 | −3.21E−06 | 5.33E−08 | 0.00E+00 |
| GC | 17 | ∞ | 0.500 | 1.471 | 64.9 | 0 | | | | | |
| | 18 | ∞ | −0.116 | 1.000 | | 0 | | | | | |

(ASP: ASPHERIC SURFACE)

FIG. 10B

EMBODIMENT 2: SURFACE SEPARATION DATA OF VARIABLE SURFACE

| SURFACE SEPARATION | WIDE END | TELEPHOTO END |
|---|---|---|
| D4 | 8.325 | 0.203 |
| D9 | 0.492 | 0.881 |
| D14 | 0.472 | 8.204 |

FIG. 11A

EMBODIMENT 3: LENS DATA

| | Si (SURFACE NUMBER) | Ri (CURVATURE RADIUS) | Di (SURFACE SEPARATION) | Ndi (REFRACTIVE INDEX) | νdj (ABBE NUMBERS) | K | ASPHERICAL COEFFICIENT | | | |
|---|---|---|---|---|---|---|---|---|---|---|
| | | | | | | | A4 | A6 | A8 | A10 |
| G1 { | 1 (ASP) | -9.231 | 0.780 | 1.515 | 63.3 | 0 | 2.77E-03 | -1.03E-04 | 3.01E-06 | -3.82E-08 |
| | 2 (ASP) | 9.880 | 1.083 | 1.000 | | 0 | 2.55E-03 | -4.17E-05 | 5.53E-07 | 7.28E-08 |
| G2 { | 3 | ∞ | 5.800 | 1.835 | 42.7 | 0 | | | | |
| | 4 | ∞ | D4 (VARIABLE) | 1.000 | | 0 | | | | |
| G3 { | 5 (ASP) | 4.433 | 1.460 | 1.471 | 76.7 | 0 | -7.60E-04 | -7.89E-05 | 1.63E-05 | 5.96E-07 |
| | 6 (ASP) | -11.065 | 0.536 | 1.000 | | 0 | 2.31E-03 | -1.94E-04 | 6.07E-05 | -3.59E-06 |
| | 7 | -12.572 | 0.926 | 1.497 | 81.5 | 0 | | | | |
| | 8 | -7.305 | 0.984 | 1.000 | | 0 | | | | |
| | 9 (DIAPHRAGM) | ∞ | D9 (VARIABLE) | | | 0 | | | | |
| G4 { | 10 | 20.347 | 1.088 | 1.835 | 42.7 | 0 | | | | |
| | 11 | -11.127 | 1.192 | 1.487 | 70.2 | 0 | | | | |
| | 12 | -7.249 | 0.205 | 1.000 | | 0 | | | | |
| | 13 | -4.429 | 0.600 | 1.847 | 23.8 | 0 | | | | |
| | 14 | 4.429 | D14 (VARIABLE) | 1.000 | | 0 | | | | |
| G5 { | 15 (ASP) | 15.045 | 2.443 | 1.683 | 31.3 | 0 | -2.74E-04 | -1.08E-04 | 9.77E-06 | -3.55E-07 |
| | 16 (ASP) | -5.446 | 0.466 | 1.000 | | 0 | 1.99E-03 | -1.40E-04 | 1.07E-05 | -3.12E-07 |
| GC { | 17 | ∞ | 0.300 | 1.517 | 64.2 | 0 | | | | |
| | 18 | ∞ | 1.486 | 1.000 | | 0 | | | | |

(ASP: ASPHERIC SURFACE)

FIG. 11B

EMBODIMENT 3: SURFACE SEPARATION DATA OF VARIABLE SURFACE

| SURFACE SEPARATION | WIDE END | TELEPHOTO END |
|---|---|---|
| D4 | 7.698 | 0.593 |
| D9 | 0.533 | 1.731 |
| D14 | 1.471 | 7.377 |

FIG. 12A

EMBODIMENT 4: LENS DATA

| Si (SURFACE NUMBER) | Ri (CURVATURE RADIUS) | Di (SURFACE SEPARATION) | Ndi (REFRACTIVE INDEX) | νdj (ABBE NUMBERS) | K | A4 | A6 | A8 | A10 |
|---|---|---|---|---|---|---|---|---|---|
| 1 (ASP) | -8.627 | 0.780 | 1.517 | 63.3 | 0 | 3.01E-03 | -1.25E-04 | 4.19E-06 | -6.15E-08 |
| 2 (ASP) | 10.178 | 1.040 | 1.000 |  | 0 | 2.81E-03 | -6.61E-05 | 2.07E-06 | 3.62E-08 |
| 3 | ∞ | 5.800 | 1.839 | 42.7 | 0 |  |  |  |  |
| 4 | ∞ | D4 (VARIABLE) | 1.000 |  | 0 |  |  |  |  |
| 5 (ASP) | 4.728 | 1.482 | 1.469 | 77.8 | 0 | -1.61E-03 | -3.88E-05 | -1.51E-06 | -2.59E-06 |
| 6 (ASP) | -8.366 | 0.730 | 1.000 |  | 0 | 1.45E-03 | 9.06E-05 | -3.72E-05 | 1.45E-06 |
| 7 | -7.953 | 0.933 | 1.498 | 81.5 | 0 |  |  |  |  |
| 8 | -5.469 | 0.598 | 1.000 |  | 0 |  |  |  |  |
| 9 (DIAPHRAGM) | ∞ | D9 (VARIABLE) |  |  | 0 |  |  |  |  |
| 10 | 14.518 | 0.977 | 1.839 | 42.7 | 0 |  |  |  |  |
| 11 | 3267.220 | 1.037 | 1.489 | 70.2 | 0 |  |  |  |  |
| 12 | -10.410 | 0.367 | 1.000 |  | 0 |  |  |  |  |
| 13 | -5.292 | 0.600 | 1.855 | 23.8 | 0 |  |  |  |  |
| 14 | 4.277 | D14 (VARIABLE) | 1.000 |  | 0 |  |  |  |  |
| 15 (ASP) | 12.752 | 2.440 | 1.688 | 31.3 | 0 | 1.35E-04 | -1.15E-04 | 1.00E-05 | -3.76E-07 |
| 16 (ASP) | -5.802 | 0.400 | 1.000 |  | 0 | 2.42E-03 | -1.79E-04 | 1.24E-05 | -3.71E-07 |
| 17 | ∞ | 0.400 | 1.519 | 64.2 | 0 |  |  |  |  |
| 18 | ∞ | 1.401 | 1.000 |  | 0 |  |  |  |  |

G1: {1, 2, 3, 4}; G2: {5, 6}; G3: {7, 8, 9}; G4: {10, 11, 12, 13, 14}; G5: {15, 16}; GC: {17, 18}

(ASP: ASPHERIC SURFACE)

FIG. 12B

EMBODIMENT 4: SURFACE SEPARATION DATA OF VARIABLE SURFACE

| SURFACE SEPARATION | WIDE END | TELEPHOTO END |
|---|---|---|
| D4 | 7.702 | 0.602 |
| D9 | 0.728 | 1.892 |
| D14 | 1.694 | 7.631 |

FIG. 13A

EMBODIMENT 5: LENS DATA

| | Si (SURFACE NUMBER) | Ri (CURVATURE RADIUS) | Di (SURFACE SEPARATION) | Ndi (REFRACTIVE INDEX) | νdj (ABBE NUMBERS) | K | A4 | A6 | ASPHERICAL COEFFICIENT A8 | A10 |
|---|---|---|---|---|---|---|---|---|---|---|
| G1 | 1 (ASP) | -26.597 | 0.801 | 1.590 | 60.4 | 0 | -2.09E-03 | 2.47E-04 | -8.47E-06 | 9.78E-08 |
| | 2 (ASP) | 5.354 | 1.358 | 1.000 | | 0 | -2.48E-03 | 1.98E-04 | 8.60E-06 | -3.51E-07 |
| G2 | 3 | ∞ | 5.800 | 1.839 | 42.7 | 0 | | | | |
| | 4 | ∞ | D4 (VARIABLE) | 1.000 | | 0 | | | | |
| G3 | 5 (ASP) | 4.494 | 2.637 | 1.473 | 76.7 | 0 | -1.63E-03 | -3.85E-05 | -6.26E-06 | -5.19E-07 |
| | 6 (ASP) | -6.225 | 2.131 | 1.000 | | 0 | 1.65E-03 | -3.40E-05 | -1.16E-05 | 3.05E-07 |
| | 7 (DIAPHRAGM) | ∞ | D7 (VARIABLE) | | | 0 | | | | |
| G4 | 8 | 66.218 | 1.640 | 1.518 | 64.1 | 0 | | | | |
| | 9 | -3.017 | 0.704 | 1.813 | 25.4 | 0 | | | | |
| | 10 | -7.432 | 0.519 | 1.000 | | 0 | | | | |
| | 11 | -10.924 | 0.604 | 1.520 | 52.4 | 0 | | | | |
| | 12 | 3.270 | D12 (VARIABLE) | 1.000 | | 0 | | | | |
| G5 | 13 (ASP) | -95.928 | 2.286 | 1.651 | 34.5 | 0 | 6.09E-04 | -5.22E-05 | 1.22E-05 | -8.14E-07 |
| | 14 (ASP) | -4.350 | 0.600 | 1.000 | | 0 | 5.37E-03 | -4.11E-04 | 3.30E-05 | -9.36E-07 |
| GC | 15 | ∞ | 0.400 | 1.519 | 64.2 | 0 | | | | |
| | 16 | ∞ | 1.007 | 1.000 | | 0 | | | | |

(ASP: ASPHERIC SURFACE)

FIG. 13B

EMBODIMENT 5: SURFACE SEPARATION DATA OF VARIABLE SURFACE

| SURFACE SEPARATION | WIDE END | TELEPHOTO END |
|---|---|---|
| D4 | 6.895 | 0.434 |
| D7 | 0.452 | 1.892 |
| D12 | 1.300 | 6.321 |

FIG. 14A

EMBODIMENT 6: LENS DATA

| | Si (SURFACE NUMBER) | Ri (CURVATURE RADIUS) | Di (SURFACE SEPARATION) | Ndi (REFRACTIVE INDEX) | νdj (ABBE NUMBERS) | K | ASPHERICAL COEFFICIENT ||||
|---|---|---|---|---|---|---|---|---|---|---|
| | | | | | | | A4 | A6 | A8 | A10 |
| G1 | 1 (ASP) | 21.886 | 0.801 | 1.590 | 60.4 | 0 | -2.98E-03 | 2.57E-04 | -9.02E-06 | 1.27E-07 |
| | 2 (ASP) | 3.995 | 1.903 | 1.000 | | 0 | -4.20E-03 | 2.09E-04 | 3.25E-06 | -5.60E-07 |
| G2 | 3 | ∞ | 5.800 | 1.839 | 42.7 | 0 | | | | |
| | 4 | ∞ | D4 (VARIABLE) | 1.000 | | 0 | | | | |
| G3 | 5 (ASP) | 4.171 | 2.617 | 1.473 | 76.7 | 0 | -1.72E-04 | 1.41E-04 | -3.70E-05 | 5.64E-06 |
| | 6 (ASP) | -9.842 | 1.960 | 1.000 | | 0 | 3.10E-03 | 2.53E-05 | -9.09E-06 | 9.97E-07 |
| | 7 (DIAPHRAGM) | ∞ | D7 (VARIABLE) | 1.000 | | 0 | | | | |
| G4 | 8 | 9.926 | 1.787 | 1.518 | 64.1 | 0 | | | | |
| | 9 | -3.018 | 0.717 | 1.672 | 33.1 | 0 | | | | |
| | 10 | -16.510 | 0.488 | 1.000 | | 0 | | | | |
| | 11 | -17.326 | 0.617 | 1.534 | 48.8 | 0 | | | | |
| | 12 | 3.247 | D12 (VARIABLE) | 1.000 | | 0 | | | | |
| G5 | 13 (ASP) | -21.419 | 2.232 | 1.651 | 34.5 | 0 | 7.10E-04 | -3.91E-04 | 3.96E-05 | -2.46E-06 |
| | 14 (ASP) | -4.139 | 0.600 | 1.000 | | 0 | 6.26E-03 | -6.92E-04 | 4.87E-05 | -1.37E-06 |
| GC | 15 | ∞ | 0.400 | 1.519 | 64.2 | 0 | | | | |
| | 16 | ∞ | 0.718 | 1.000 | | 0 | | | | |

(ASP : ASPHERIC SURFACE)

FIG. 14B

EMBODIMENT 6: SURFACE SEPARATION DATA OF VARIABLE SURFACE

| SURFACE SEPARATION | WIDE END | TELEPHOTO END |
|---|---|---|
| D4 | 6.875 | 0.352 |
| D7 | 0.345 | 1.315 |
| D12 | 1.300 | 6.854 |

FIG. 15A

EMBODIMENT 7: LENS DATA

| | Si (SURFACE NUMBER) | Ri (CURVATURE RADIUS) | Di (SURFACE SEPARATION) | Ndi (REFRACTIVE INDEX) | νdj (ABBE NUMBERS) | K | A4 | A6 | A8 | A10 |
|---|---|---|---|---|---|---|---|---|---|---|
| G1 | 1 (ASP) | −14.311 | 0.700 | 1.588 | 60.4 | 0 | 1.35E−03 | −4.23E−05 | 1.26E−06 | −1.47E−08 |
| | 2 (ASP) | 18.681 | 1.190 | 1.000 | | 0 | 1.46E−03 | −2.48E−05 | 9.37E−07 | 1.04E−08 |
| G2 | 3 | ∞ | 7.000 | 1.834 | 37.2 | 0 | | | | |
| | 4 | ∞ | D4 (VARIABLE) | 1.000 | | 0 | | | | |
| G3 | 5 (ASP) | 13.698 | 0.987 | 1.713 | 53.9 | 0 | | | | |
| | 6 (ASP) | −29.388 | 0.198 | 1.000 | | 0 | | | | |
| | 7 | 5.570 | 1.150 | 1.516 | 64.1 | 0 | | | | |
| | 8 | 74.820 | 1.047 | 1.000 | | 0 | | | | |
| | 9 (DIAPHRAGM) | ∞ | D9 (VARIABLE) | | | 0 | | | | |
| G4 | 10 | 3.952 | 1.175 | 1.517 | 52.4 | 0 | | | | |
| | 11 | ∞ | 1.147 | 2.003 | 28.3 | 0 | | | | |
| | 12 | 2.817 | 1.167 | 1.000 | | 0 | | | | |
| | 13 (ASP) | 24.432 | 0.700 | 1.604 | 27.2 | 0 | −1.56E−02 | 3.60E−04 | −9.68E−05 | 1.15E−05 |
| | 14 (ASP) | 6.731 | D14 (VARIABLE) | 1.000 | | 0 | −1.25E−02 | 4.50E−04 | 3.06E−05 | −1.78E−06 |
| G5 | 15 (ASP) | 13.430 | 3.997 | 1.647 | 34.5 | 0 | 4.37E−05 | −5.77E−05 | 3.87E−06 | −6.83E−08 |
| | 16 (ASP) | −6.279 | 0.500 | 1.000 | | 0 | 1.57E−03 | −9.65E−05 | 5.87E−06 | −9.18E−08 |
| GC | 17 | ∞ | 0.500 | 1.471 | 65.5 | 0 | | | | |
| | 18 | ∞ | 0.595 | 1.000 | | 0 | | | | |

(ASP: ASPHERIC SURFACE)

FIG. 15B

EMBODIMENT 7: SURFACE SEPARATION DATA OF VARIABLE SURFACE

| SURFACE SEPARATION | WIDE END | TELEPHOTO END |
|---|---|---|
| D4 | 8.470 | 0.350 |
| D9 | 0.354 | 0.760 |
| D14 | 0.536 | 8.251 |

FIG. 16

| | VALUE OF CONDITIONAL EXPRESSION | | | | |
|---|---|---|---|---|---|
| | fw | ft | (1) f3/f4 | (2) DA/fw | (3) νG3 |
| EMBODIMENT 1 | 5 | 13.7 | −1.08 | 2.49 | 63.3 |
| EMBODIMENT 2 | 6.44 | 17.8 | −1.37 | 2.33 | 54.6 |
| EMBODIMENT 3 | 4.84 | 13.3 | −1.3 | 2.55 | 79.1 |
| EMBODIMENT 4 | 4.86 | 13.4 | −1.34 | 2.53 | 79.6 |
| EMBODIMENT 5 | 4.8 | 13.3 | −1.13 | 2.60 | 76.7 |
| EMBODIMENT 6 | 4.89 | 13.56 | −0.89 | 2.64 | 76.7 |
| EMBODIMENT 7 | 6.57 | 18.2 | −1.48 | 2.19 | 59.0 |

EMBODIMENT 1: WIDE END

SPHERICAL ABERRATION

ASTIGMATISM

DISTORTION

EMBODIMENT 1: TELEPHOTO END

SPHERICAL ABERRATION

ASTIGMATISM

DISTORTION

EMBODIMENT 2: WIDE END

SPHERICAL ABERRATION

ASTIGMATISM

DISTORTION

EMBODIMENT 2: TELEPHOTO END

SPHERICAL ABERRATION

ASTIGMATISM

DISTORTION

EMBODIMENT 3: WIDE END

SPHERICAL ABERRATION

ASTIGMATISM

DISTORTION

EMBODIMENT 3: TELEPHOTO END

SPHERICAL ABERRATION

ASTIGMATISM

DISTORTION

EMBODIMENT 4: WIDE END

SPHERICAL ABERRATION

ASTIGMATISM

DISTORTION

EMBODIMENT 4: TELEPHOTO END

SPHERICAL ABERRATION

ASTIGMATISM

DISTORTION

EMBODIMENT 5: WIDE END

EMBODIMENT 5: TELEPHOTO END

EMBODIMENT 6: WIDE END

SPHERICAL ABERRATION

ASTIGMATISM

DISTORTION

EMBODIMENT 6: TELEPHOTO END

SPHERICAL ABERRATION

ASTIGMATISM

DISTORTION

EMBODIMENT 7: WIDE END

SPHERICAL ABERRATION

ASTIGMATISM

DISTORTION

EMBODIMENT 7: TELEPHOTO END

SPHERICAL ABERRATION

ASTIGMATISM

DISTORTION

ZOOM LENS

CROSS-REFERENCE TO RELATED APPLICATIONS

This application is based on and claims priority under 35 USC 119 from Japanese Patent Application No. 2007-35642 filed Feb. 16, 2007.

BACKGROUND

1. Technical Field

The present invention relates to a zoom lens which is to be suitably used on a small-sized appliance having an imaging function, particularly on a digital still camera, a portable cellular phone with camera, a personal digital assistant (PDA) or the like.

2. Related Art

Recently, the imaging device, such as the digital still camera, is demanded to be reduced wholly in size as size reduction proceeds for the imaging device, such as the CCD (charge coupled devices) and the CMOS (complementary metal oxide semiconductor). In such a situation, development has been made on a structure reduced in thickness in order to be incorporated in the imager device by bending the optical path intermediately of its lens system into so-called a bending optical system.

As a zoom lens using a bending optical system, Patent Document 1 (JP-A-2000-131610) describes a zoom lens structured with a first lens group having a positive refractive power, a second lens group having a negative refractive power, a third lens group having a positive refractive power and a fourth lens group having a positive refractive power in order from an object side and magnification of the zoom lens is to be varied by moving the negative second lens group and the positive fourth lens group. In this zoom lens, the optical path is bent at approximately 90 degrees by arranging a prism in the first lens group. In the first lens group, a fixed positive lens group is arranged in back of the prism. Meanwhile, Patent Document 2 (JP A 2004-205796 corresponding to U.S. Pat. No. 7,079,328 B2) describes a zoom lens structured with a first lens group having a negative refractive power, a second lens group having a positive refractive power, a third lens group having a negative refractive power and a fourth lens group having a positive refractive power, in the order from the object side and magnification of the zoom lens is to be varied by moving the positive second lens group and the negative third lens group. In this zoom lens, the optical path is bent at approximately 90 degrees by arranging a prism in the first lens group in a position closest to the object. In the first lens group, a fixed lens group is arranged in back of the prism.

As described in Patent Documents 1 and 2, the conventional bending type zoom lens is arranged with a fixed lens group in back of the optical-path bending prism in the first lens group, and the zooming group in back thereof. Particularly, it is often the case to arrange a positive lens group fixed upon zooming, in back of an optical-path bending prism in the first lens group and a zooming group in back thereof. The zooming group, in many cases, is structured with a negative lens group and a positive lens group in order from the object side. In the meanwhile, where a bend-type zoom lens is used in the personal digital assistant application, the entire volume is required small in addition to the reduced thickness as a lens module. However, the conventional bending type zoom lens is designed intended mainly for its radial (bent direction orthogonal to the optical axis) size in the viewpoint of thickness reduction. Less or no consideration is paid for the length in a direction of the bent optical axis. This is because of the recognition that, in the bend-type zoom lens, shortening is fully done by bending the optical path. However, it is becoming important to reduce the overall length in order to reduce the entire volume. Therefore, for the bending type zoom lens, development is desired for a lens reduced in overall length.

The present invention, made in view of the foregoing problem, aims at providing a zoom lens that the overall length can be reduced while maintaining a well optical characteristic as compared to the conventional bending type zoom lens arranged with a fixed lens group between an optical-path bending prism and a zooming group.

SUMMARY

[1] According to an aspect of the invention, a zoom lens includes a first lens group, a second lens group, a third lens group, a fourth lens group and fifth lens group. The first lens group is fixed upon zooming and wholly has a negative refractive power. The second lens group includes an optical path bending prism. The second lens group is fixed upon zooming. The third lens group is allowed to move upon zooming and wholly has a positive refractive power. The fourth lens group is allowed to move upon zooming and wholly has a negative refractive power. The fifth lens group is fixed upon zooming and wholly has a positive refractive power.

[2] According to the zoom lens of [1], the zoom lens may further satisfy the following Conditional Expressions (1) to (2) are satisfied:

$$-1.5 < f3/f4 < -0.5 \tag{1}$$

$$2.0 < DA/f_W < 3.0 \tag{2}$$

where f3 denotes focal length of the third lens group, f4 denotes focal length of the fourth lens group, $f_W$ denotes focal length of a system overall at a wide-angle end, and DA denotes optical path length from an image-side surface of the first lens group to an object-side surface of the third lens group, at a telephoto end.

According to [1] or [2], the second lens group includes an optical-path bending prism not having a refractive power, to arrange a zooming group having the positive third and negative fourth lens groups in back thereof without arranging a fixed positive lens group. This can easily reduce the overall length as compared to the structure arranging a fixed lens group in back of an optical-path bending prism and a zooming group in back thereof. Particularly, the overall length can be easily reduced as compared to the convention structure that arranges a fixed positive lens group in back of a prism and a zoom group, having negative and positive lens groups, in back thereof.

Furthermore, optical characteristics can be provided well by suitably employing and satisfying the following preferable conditions in accordance with the specifications, etc. required.

[3] According to the zoom lens any of [1] to [2], the first lens group may include a negative aspheric lens having a concave surface directed toward, on an optical axis, an image side. The third lens group may include at least a positive lens having a convex surface directed toward the object side. The fourth lens group may include at least a negative lens having a concave surface directed toward the image side. The fifth lens group may include a positive aspheric lens having a convex surface directed toward the image side.

[4] According to the zoom lens of [3], the zoom lens may further satisfy the following Conditional Expression (3):

$$50 < \nu G3 \qquad (3)$$

where

νG3 denotes mean value of Abbe numbers at d-line over lenses in the third lens group.

[5] According to the zoom lens any of [3] or [4], the fourth lens group may include a cemented lens and a negative lens. The cemented lens includes two lenses. The negative lens has a concave surface directed toward the image side.

[6] According to the zoom lens any of [3] or [4], the fourth lens group may includes (i) a cemented lens that includes a positive lens and a first negative lens, and (ii) a second negative lens. The first negative lens is configured to be a negative lens having a concave surface directed toward the image side.

[7] According to the zoom lens any of [3] to [6], the third lens group may include two spherical lenses.

[8] According to the zoom lens any of [3] to [6], the third lens group may include (i) a positive aspheric lens at both surfaces, the positive aspheric lens having a convex surface directed toward the object side and (ii) a spherical lens.

According to any of [1] to [8], the second lens group includes an optical-path bending prism not having a refractive power, to arrange the zooming group having the positive third and negative fourth lens groups in back thereof without arranging a fixed positive lens group. This can easily reduce the overall length while maintaining the optical characteristics well as compared to the structure arranging a fixed lens group in back of an optical-path bending prism and a zooming group in back thereof.

BRIEF DESCRIPTION OF THE DRAWINGS

FIGS. 9A and 9B show a figure showing the lens data concerning the zoom lens of embodiment 1. Basic lens data is shown in FIG. 9A while surface separation data is shown in a portion to be moved by varying the magnification in FIG. 9B.

FIGS. 10A and 10B show a figure showing the lens data concerning the zoom lens of embodiment 2. Basic lens data is shown in FIG. 10A while surface separation data is shown in a portion to be moved by varying the magnification in FIG. 10B.

FIGS. 11A and 11B show a figure showing the lens data concerning the zoom lens of embodiment 3. Basic lens data is shown in FIG. 11A while surface separation data is shown in a portion to be moved by varying the magnification in FIG. 11B.

FIGS. 12A and 12B show a figure showing the lens data concerning the zoom lens of embodiment 4. Basic lens data is shown in FIG. 12A while surface separation data is shown in a portion to be moved by varying the magnification in FIG. 12B.

FIGS. 13A and 13B show a figure showing the lens data concerning the zoom lens of embodiment 5. Basic lens data is shown in FIG. 13A while surface separation data is shown in a portion to be moved by varying the magnification in FIG. 13B.

FIGS. 14A and 14B show a figure showing the lens data concerning the zoom lens of embodiment 6. Basic lens data is shown in FIG. 14A while surface separation data is shown in a portion to be moved by varying the magnification in FIG. 14B.

FIGS. 15A and 15B show a figure showing the lens data concerning the zoom lens of embodiment 7. Basic lens data is shown in FIG. 15A while surface separation data is shown in a portion to be moved by varying the magnification in FIG. 15B.

FIG. 16 shows a figure collectively showing the values related to conditional expressions, on each of the embodiments.

DETAILED DESCRIPTION

With reference to the drawings, explanation will be made in detail on embodiments according to the present invention.

Figure 1:
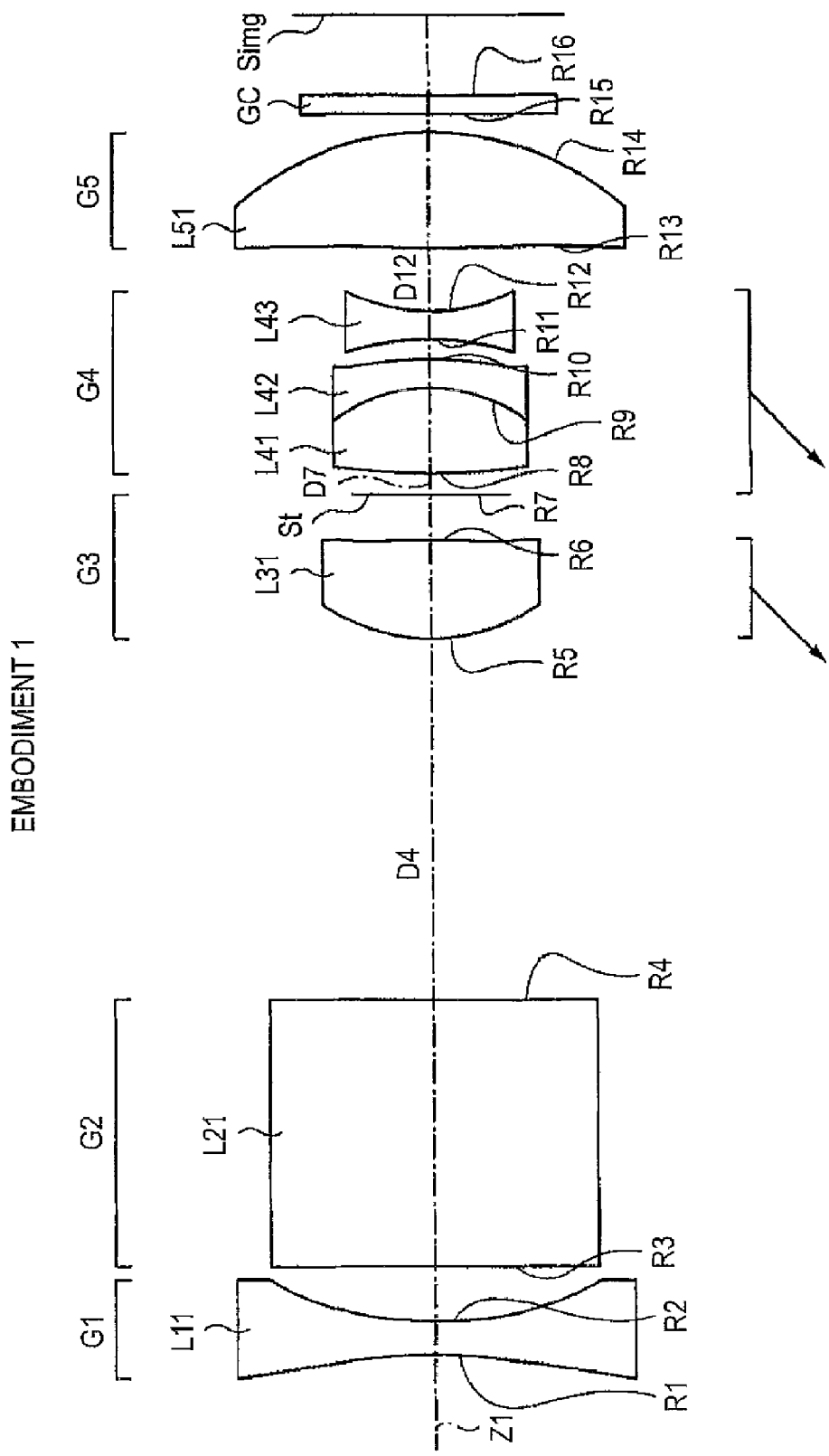
FIG. 1 shows a lens sectional view showing a first arrangement of a zoom lens according to an embodiment of the present invention, corresponding to embodiment 1.

FIG. 1 shows a first arrangement of a zoom lens according to an embodiment of the invention. This arrangement corresponds to a first numerical embodiment of lens arrangement (FIGS. 9A, 9B), referred later. FIGS. 2 to 7 show second to seventh arrangements corresponding to second to seventh numerical embodiments of lens arrangements (FIGS. 10A, 10B-15A, 15B), referred later. In FIGS. 1 to 7, the reference character Ri represents a curvature radius of an i-th surface provided to gradually increase as nearing toward the image by taking the structural element surface closest to the object as the first. The reference character Di represents a surface separation between the i-th surface and the (i+1)-th surface, on an optical axis Z1. Note that the reference character Di is provided only for the surface separation in a region to change with the change of magnification. Incidentally, FIGS. 1 to 7 illustrate lens arrangement at the wide end.

The present zoom lens is for use on a small-sized apparatus having an imaging function, e.g. a digital still camera, a portable cellular phone with camera or a PDA. The zoom lens includes a first lens group G1 having a negative refractive power, a second lens group G2, a third lens group G3 having a positive refractive power, a fourth lens group G4 having a negative refractive power and a fifth lens group G5 having a positive refractive power, in order from the object on the optical axis Z1 thereof. The second lens group G2, formed by a prism L21 for bending the optical path, does not have a refractive power as a whole. An aperture diaphragm St is arranged, for example, in the third lens group G3.

The zoom lens has an image surface Simg in which an imager device, not shown, is arranged. Various optical members GC are arranged between the fifth lens group G5 and the image surface, in accordance with the camera-side structure on which the lens is to be mounted. As the optical members SC, plate members are arranged, e.g. an image-surface protecting cover glass or various optical filters.

In the zoom lens, the first, second and fifth lens groups G1, G2, G5 are fixed at all times upon zooming whereas the third and fourth lens groups G3, G4 are to move separately on the optical axis Z1 upon zooming. As magnification is varied from the wide end to the telephoto end, the third and fourth lens groups G3, G4 move toward the object on the optical axis Z1, as shown with the arrow in FIGS. 1 to 7.

Figure 7:
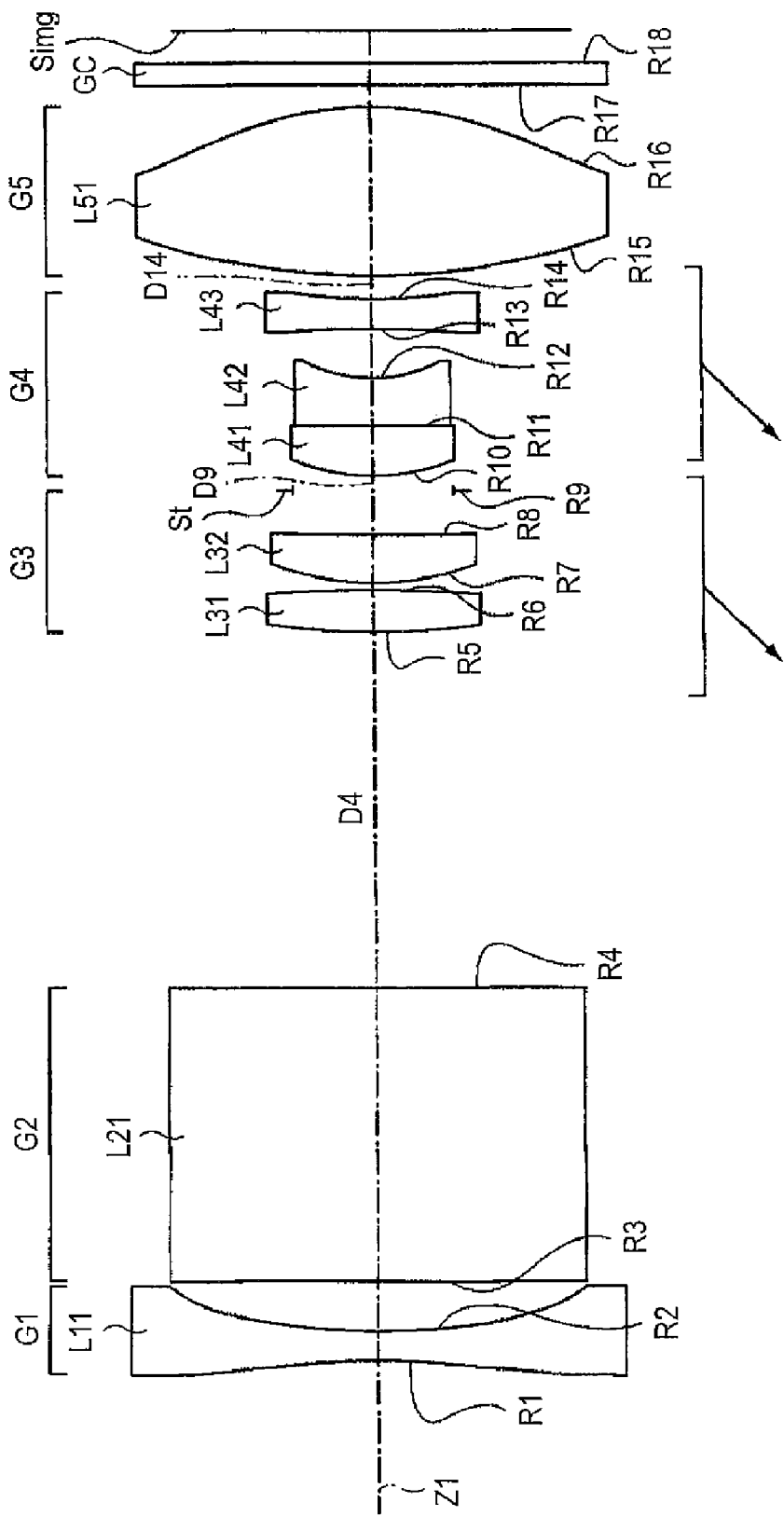
FIG. 7 shows a lens sectional view showing a seventh arrangement of a zoom lens according to the embodiment of the invention, corresponding to embodiment 7.
Figure 8:
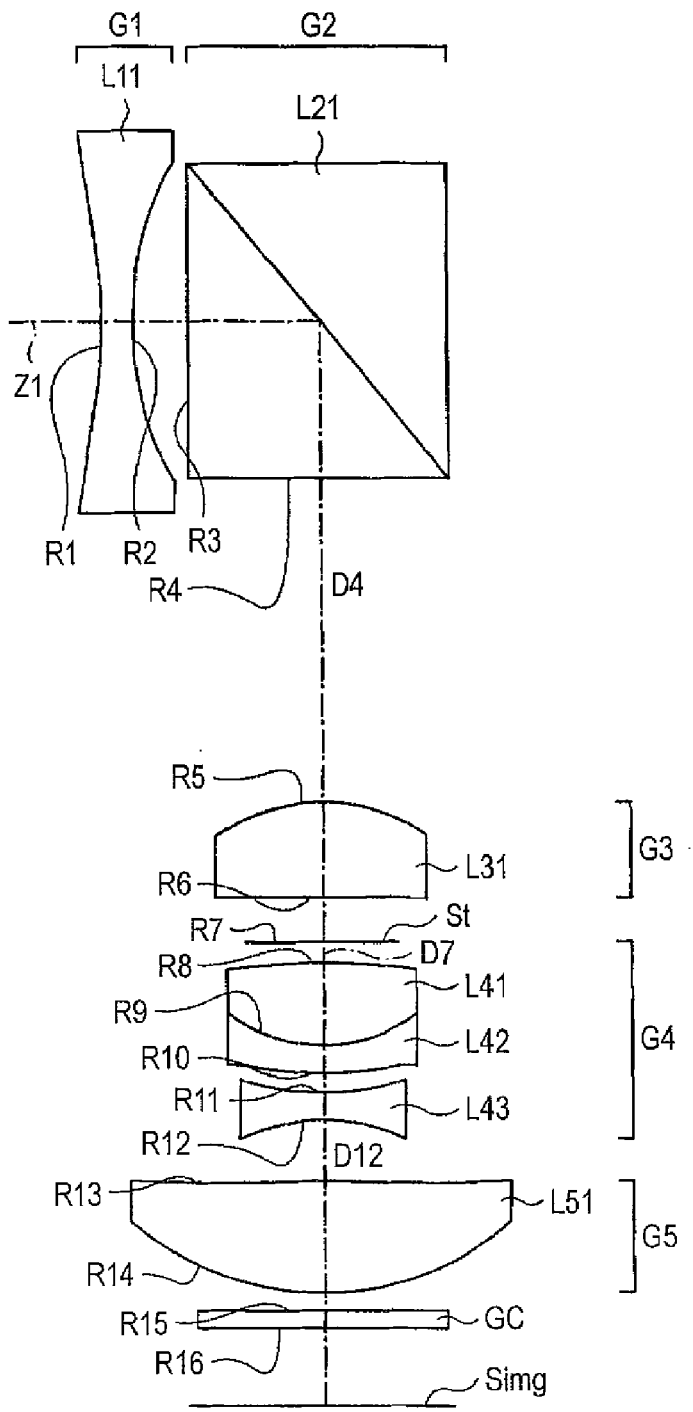
FIG. 8 shows a lens sectional view showing a structure of a bending optical system.

The zoom lens in this embodiment is a bend optical system, whose optical path is actually bent at approximately 90 degrees by the prism L21 at its interior reflective plane 10 as shown in FIG. 8. In FIGS. 1 to 7, the zoom lens is shown by expansion in the same direction on the optical axis Z1 with the interior reflective surface 10 of the prism L21 omitted.

The first lens group G1 is formed by one negative lens L11 having a concave surface directed toward the image side. In the first to fifth and seventh arrangements of FIGS. 1 to 5 and 7, the negative lens L11 is provided as a biconcave lens. In the sixth arrangement of FIG. 6, the negative lens L11 is provided as a meniscus lens having a concave surface directed toward the image side. The negative lens L11 is preferably aspheric at both surfaces.

The third lens group G3 includes at least a positive lens having a convex surface directed toward the object side. In the first, fifth and sixth arrangements of FIGS. 1, 5 and 6, the third lens group G3 is formed by one positive lens L31 having a convex surface directed toward the object side. In the first, fifth and sixth arrangements, the positive lens L31 is preferably aspheric at both surfaces. In the second arrangement of FIG. 2, third arrangement of FIG. 3, fourth arrangement of FIG. 4 and seventh arrangements of FIG. 7, the third lens group G3 is formed by two lenses, i.e. a positive lens L31 having a convex surface directed toward the object side and another lens L32. Particularly, in the second and seventh arrangements of FIGS. 2 and 7, both the positive lens L31 and the other lens L32 are spherical lenses. In the third and fourth arrangements of FIGS. 3 and 4, the positive lens L31 is a positive lens that is aspheric at both surfaces while the other lens 132 is a spherical surface.

The fourth lens group G4 includes at least a negative lens having a concave surface directed toward the image side. In the arrangements of FIGS. 1 to 7, the fourth lens group G4 is structured with a cemented lens, having two lenses L41, L42, and one negative lens L43. Particularly, in the second arrangement of FIG. 2, the fourth lens group G4 includes (i) a cemented lens, having a positive lens L41 and a first negative lens L42, and (ii) a second negative lens L43. The first negative lens L42 of those is a negative lens having a concave surface directed toward the image. Particularly, in the seventh arrangement of FIG. 7, the fourth lens group G4 includes (i) a cemented lens, having a positive lens L41 and a first negative lens L42, and (ii) a second negative lens L43. Both the first negative lens L42 and the second negative lens L43 are negative lenses whose concave surfaces are directed toward the image side. In the other arrangements, the negative lens L43 is a negative lens having a concave surface directed toward the image side.

Figure 3:
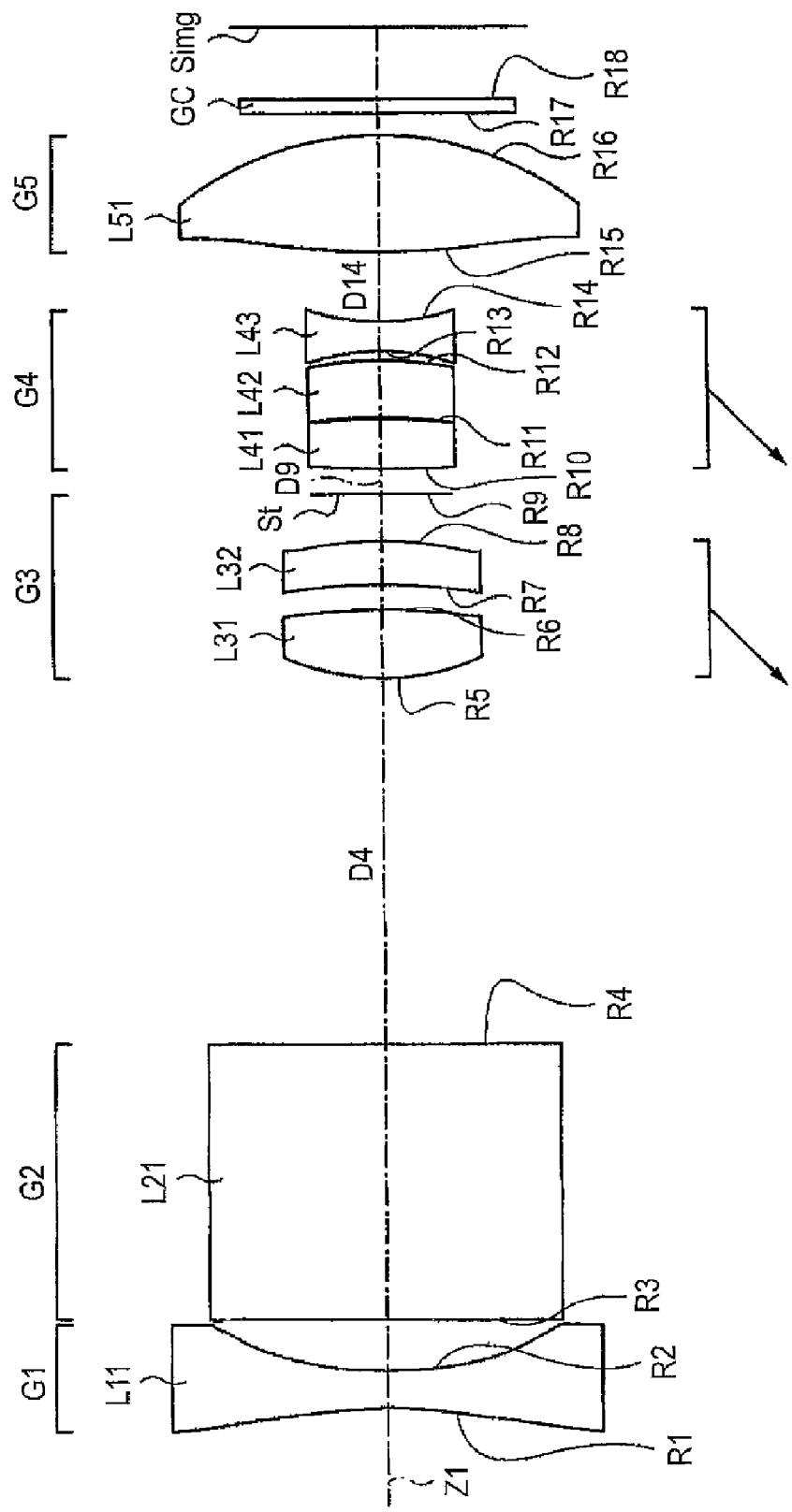
FIG. 3 shows a lens sectional view showing a third arrangement of a zoom lens according to the embodiment of the invention, corresponding to embodiment 3.
Figure 4:
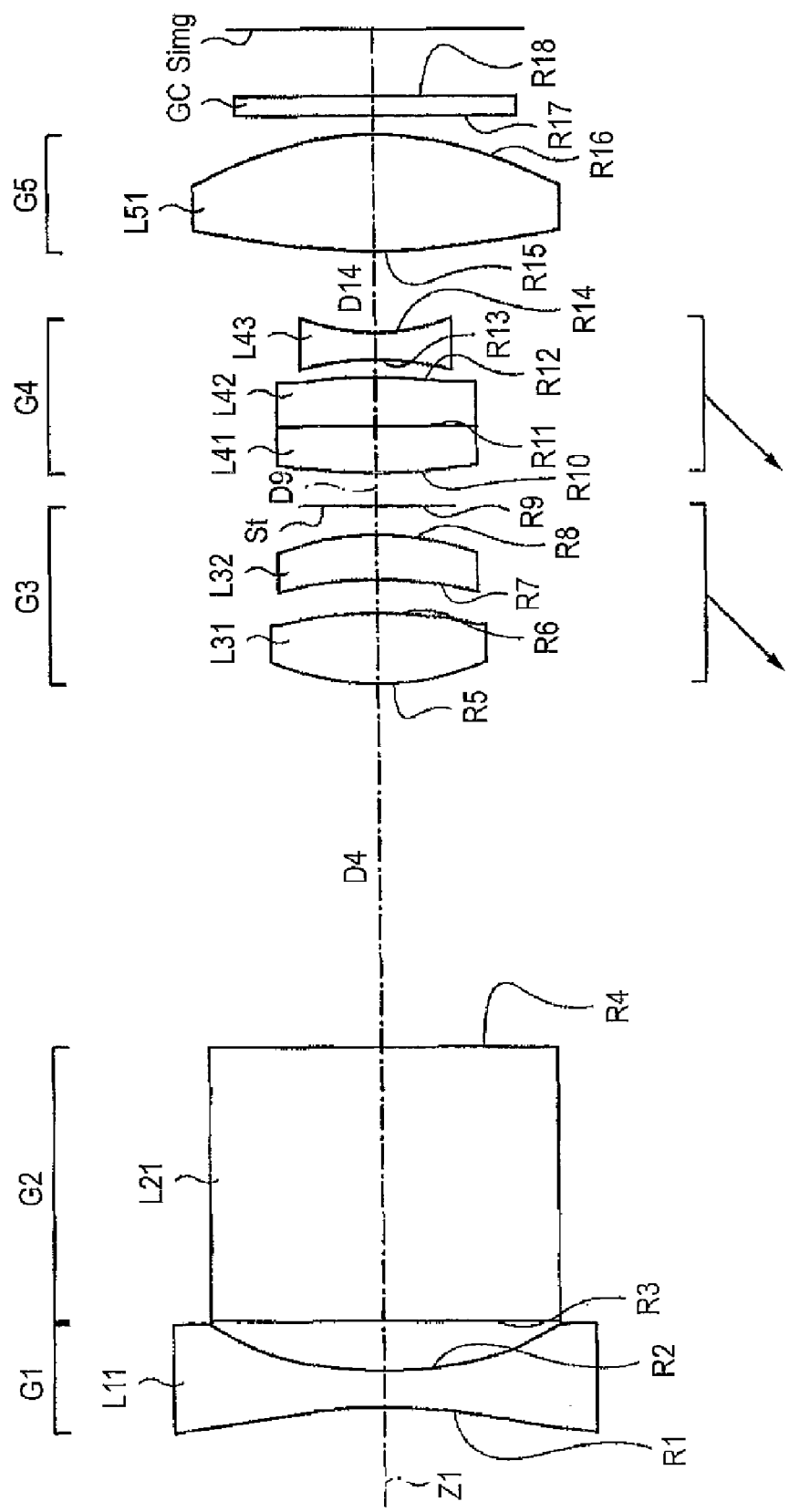
FIG. 4 shows a lens sectional view showing a fourth arrangement of a zoom lens according to the embodiment of the invention, corresponding to embodiment 4.

Incidentally, in the third and fourth arrangements of FIGS. 3 and 4, both the two lenses L41, L42 including the cemented lens are provided as positive lenses. In this case, Abbe numbers particularly is preferably provided greater for the lens L42 and smaller for the negative lens L43 in order to suppress the occurrence of chromatic aberration.

The fifth lens group G5 includes one positive lens L51 having a convex surface directed toward the image side. The positive lens L51 is preferably aspheric at both surfaces.

The present zoom lens preferably satisfies the following conditional expressions (1), (2). In the expression, f3 denotes a focal length of the third lens group G3, f4 denotes a focal length of the fourth lens group G4 and fw denotes a focal length of the overall system at the wide end. DA represents an optical path length from the image-side surface of the first lens group G1 to the object-side surface of the third lens group G3, at the telephoto end.

$$-1.5 < f3/f4 < -0.5 \tag{1}$$

$$2.0 < DA/f_W < 3.0 \tag{2}$$

Meanwhile, the following conditional expression is preferably satisfied. In the expression, vG3 denotes a mean value of Abbe numbers at d-line over the lenses in the third lens group G3.

$$50 < vG3 \tag{3}$$

Now, explanation is made on the function and effect of the zoom lens configured as above.

In the zoom lens the second lens group G2 is the prism L21 for bending the optical path without having a refractive power. In back of the prism L21, a zooming group is arranged with the third and fourth lens groups G3, G4 without arranging a fixed lens groups. Particularly, this makes it possible to reduce the overall length as compared to the conventional structure that a zooming group having negative and positive lens groups is arranged in back of the same.

The conditional expression (1) defines a proper relationship in refractive power between the third lens group G3 and the fourth lens groups G4. In case exceeding the upper limit of the conditional expression (1), the total length increases excessively. In case exceeding the lower limit, the overall length decreases but the characteristics deteriorate, which is not preferable because of the difficulty in taking an longitudinal chromatic aberration.

The conditional expression (2) defines a proper group-to-group spacing between the first lens group G1 and the third lens group G3. In case going below the lower limit of the conditional expression (2), there encounters a difficulty in arranging the optical-path bending prism L21 between those groups, thus making it impossible to structure a bend optical system. In case exceeding the upper limit, the group-to-group spacing increases excessively, thus unfavorably resulting in excessively increased size as a whole.

The conditional expression (3) concerns with the lens material of the third lens group G3, contributing to the correction for chromatic aberration. In case going below the lower limit of the conditional expression (3), chromatic aberration excessively increases thus unfavorably resulting in the difficulty in realizing a zoom lens having well characteristics.

As described above, the zoom lens according to the present embodiment can be reduced in overall length while maintaining the optical characteristic well as compared to the conventional bending type zoom lens arranging a fixed lens group between an optical-path bending prism and a zooming group.

Now, explanation is made below on concrete numerical embodiments of the zoom lens according to the present embodiment. The first to seventh numerical embodiments are collectively explained in the following.

FIGS. 9A and 9B show concrete lens data corresponding to the zoom lens arrangement shown in FIG. 1. In the column of surface number Si of FIG. 9A lens data, there is shown an i-th surface of the zoom lens in embodiment 1. The reference character is provided to gradually increase as nearing toward the image by taking the structural element surface closest to the object as the first. In the column of curvature radius Ri, there is shown a value of curvature radius (mm) of the i-th surface taken closer to the object, correspondingly to the reference character Ri given in FIG. 1. In the column of surface separation Di, there is similarly shown an on-axis spacing (mm) between the surface Si taken as i-th one closer to the object and the surface (Si+1) taken as (i+1)-th one closer to the object. In the column of Ndi, there is shown a value of refractive index at d-line (wavelength 587.6 nm) between the surface Si taken as i-th one closer to the object and the surface (Si+1) taken as (i+1)-th one closer to the object. In the column of vdi, there is shown a value of Abbe numbers at d-line of the optical element taken as j-th one closer to the object.

In the zoom lens of embodiment 1, the third lens group G3 is formed by only one positive lens L3 as its lens element. Because the third and fourth lens groups G3, G4 are moved axially upon varying the magnification, the values of surface separation D4, D7, D12 are provided variable at front and back of the respective groups. FIG. 9B shows a value at wide and telephoto ends, as data of surface separation D4, D7, D12 upon varying the magnification.

In the lens data of FIG. 9A, the characters "YASP" attached at left of the surface number represents that the relevant lens surface is aspheric in form. The zoom lens of embodiment 1 is made aspheric in form at all of both surfaces S1, S2 of the negative lens L11 (first lens group G1), both surfaces S5, S6 of the positive lens L31 (third lens group G3) and both surfaces S13, S14 of the positive lens L51 (fifth lens group G5). In the column of radius-of-curvature Ri of FIG. 9(A), there is shown a numerical value of curvature radius in a position close to the optical axis, as a curvature radius of the aspheric surface.

In the numerical values shown as aspheric data in FIG. 9A, the character "E" represents that the following numeral is of a "power exponent" having a bottom of 10, representing that the numerical value expressed by the exponent function having the bottom of 10 is multiplied on the numerical value preceding to "E". For example, "1.0E−02" represents "1.0× $10^{-2}$".

As the aspheric data of the zoom lens of embodiment 1, the values of coefficients An, K are described of an aspheric form expression represented by the following expression (A). Z represent, specifically, the length (mm) of a vertical line drawn from a point of an aspheric surface, in a height h with respect to the optical axis, onto a tangential plane passing through the summit of the aspheric surface.

$$Z = C \cdot h^2 / \{1 + (1-(K+1) \cdot C^2 \cdot h^2)^{1/2}\} + \Sigma A_n \cdot h^n \tag{A}$$

(n: integer equal to or greater than 3)

where

Z: depth of aspheric surface (mm), h: distance (height) from the optical axis to the lens surface (mm), K: circular cone constant, C: paraxial curvature radius=1/R (R: paraxial curvature radius), and $A_n$: n-th order aspheric coefficient In the zoom lens of embodiment 1, the aspheric surfaces are represented by effectively using even-order coefficients $A_4$, $A_6$, $A_8$, $A_{10}$ where the aspheric coefficient is taken $A_n$.

Figure 2:
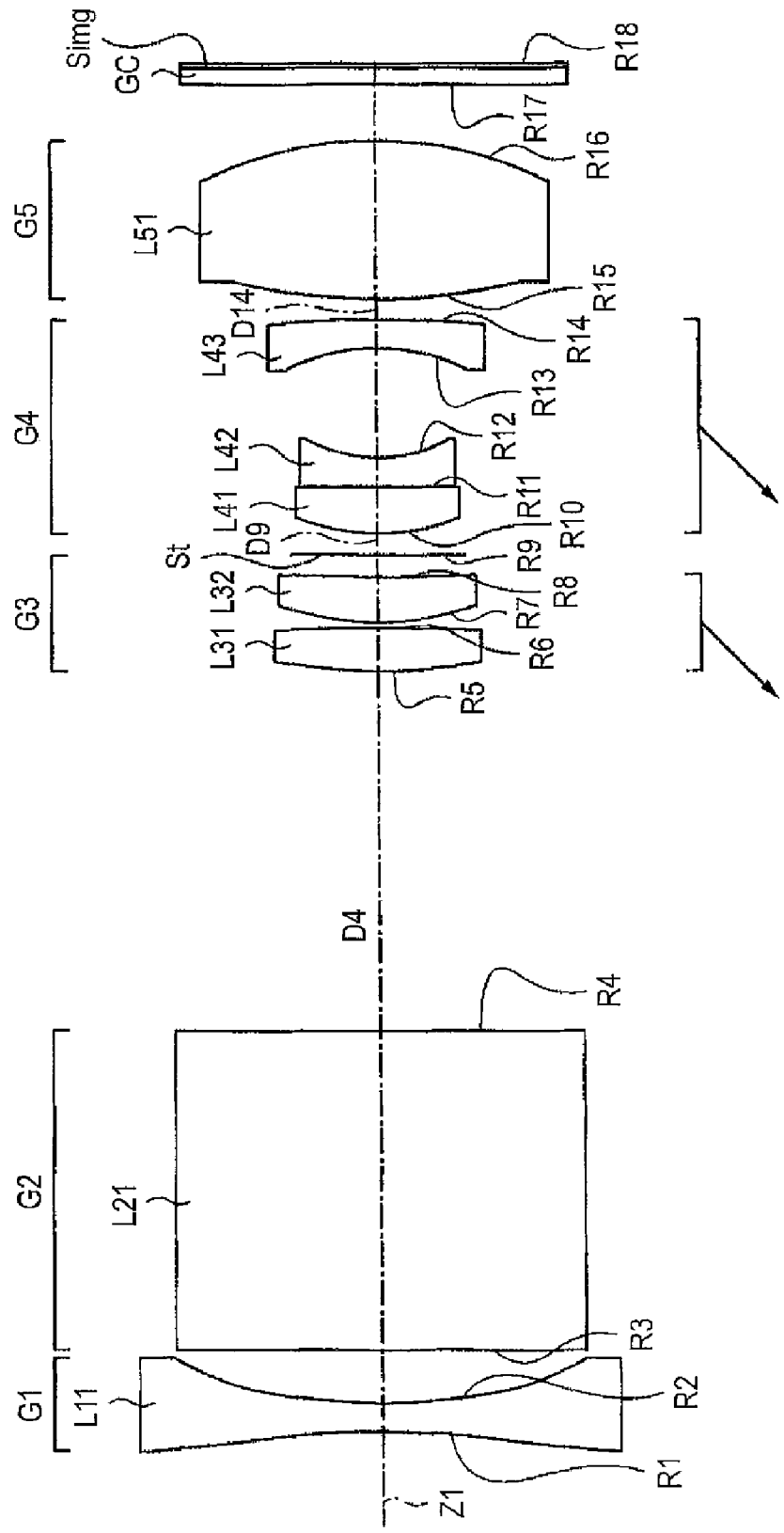
FIG. 2 shows a lens sectional view showing a second arrangement of a zoom lens according to the embodiment of the invention, corresponding to embodiment 2.

FIGS. 10A and 10B show, as embodiment 2, the concrete lens data corresponding to the FIG. 2 zoom lens structure, similarly to the zoom lens of the foregoing embodiment 1. The zoom lens of embodiment 2 is formed with two spherical lenses (lenses L31, L32), as the lens elements in the third lens group G3. Because the third and fourth lens groups G3, G4 are axially moved by varying the magnification, the values of surface separation D4, D9, D14 are variable at front and back of those groups. FIG. 10B shows data values of surface separation D4, D9, D14 at the wide and telephoto ends upon varying the magnification. The zoom lens of embodiment 2 is made aspheric in form at both surfaces S1, S2 of the negative lens L11 (first lens group G1), an image-side surface S14 of the negative lens L43 of the fourth lens group G4 and both surfaces S15, S16 of the positive lens L51 (fifth lens group G5). In the zoom lens of embodiment 2, the aspheric surfaces are represented by effectively using even-order coefficients $A_4, A_6, A_8, A_{10}, A_{12}$.

Likewise, FIGS. 11A and 11B show, as embodiment 3, the concrete lens data corresponding to the FIG. 3 zoom lens structure, similarly to the zoom lens of the foregoing embodiment 1. The zoom lens of embodiment 3 is formed with one aspheric lens (lens L31) and one spherical lens (lens L31), as the lens elements in the third lens group G3. Because the third and fourth lens groups G3, G4 are axially moved upon varying the magnification, the values of surface separation D4, D9, D14 are variable at front and back of those groups. FIG. 11B shows data values of surface separation spacing D4, D9, D14 at the wide and telephoto ends upon varying the magnification. The zoom lens of embodiment 3 is made aspheric in form at both surfaces S1, S2 of the negative lens L11 (first lens group G1), both surfaces S5, S6 of the positive lens L31 in the third lens group G3 and both surfaces S15, 316 of the positive lens L51 (fifth lens group G5). In the zoom lens of embodiment 3, the aspheric surfaces are represented by effectively using even-order coefficients $A_4, A_6, A_8, A_{10}$.

Likewise, FIGS. 12A and 12B show, as embodiment 4, the concrete lens data corresponding to the FIG. 4 zoom lens structure. The zoom lens of embodiment 4 is similar in basic arrangement to the zoom lens of embodiment 3.

Figure 5:
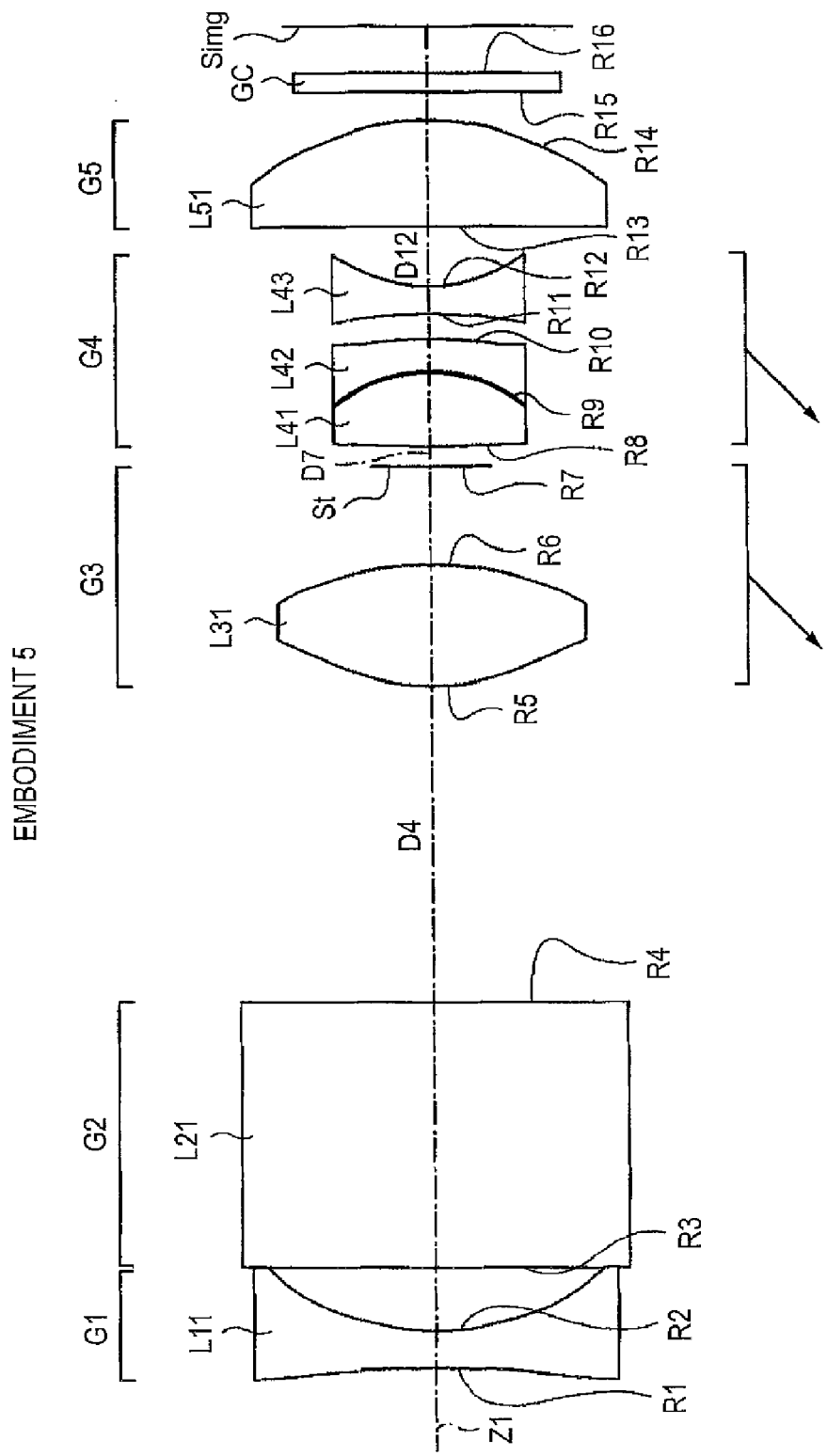
FIG. 5 shows a lens sectional view showing a fifth arrangement of a zoom lens according to the embodiment of the invention, corresponding to embodiment 5.

Likewise, FIGS. 13A and 13B show, as embodiment 5, the concrete lens data corresponding to the FIG. 5 zoom lens. The zoom lens of embodiment 5 is similar in basic arrangement to the zoom lens of embodiment 1.

Figure 6:
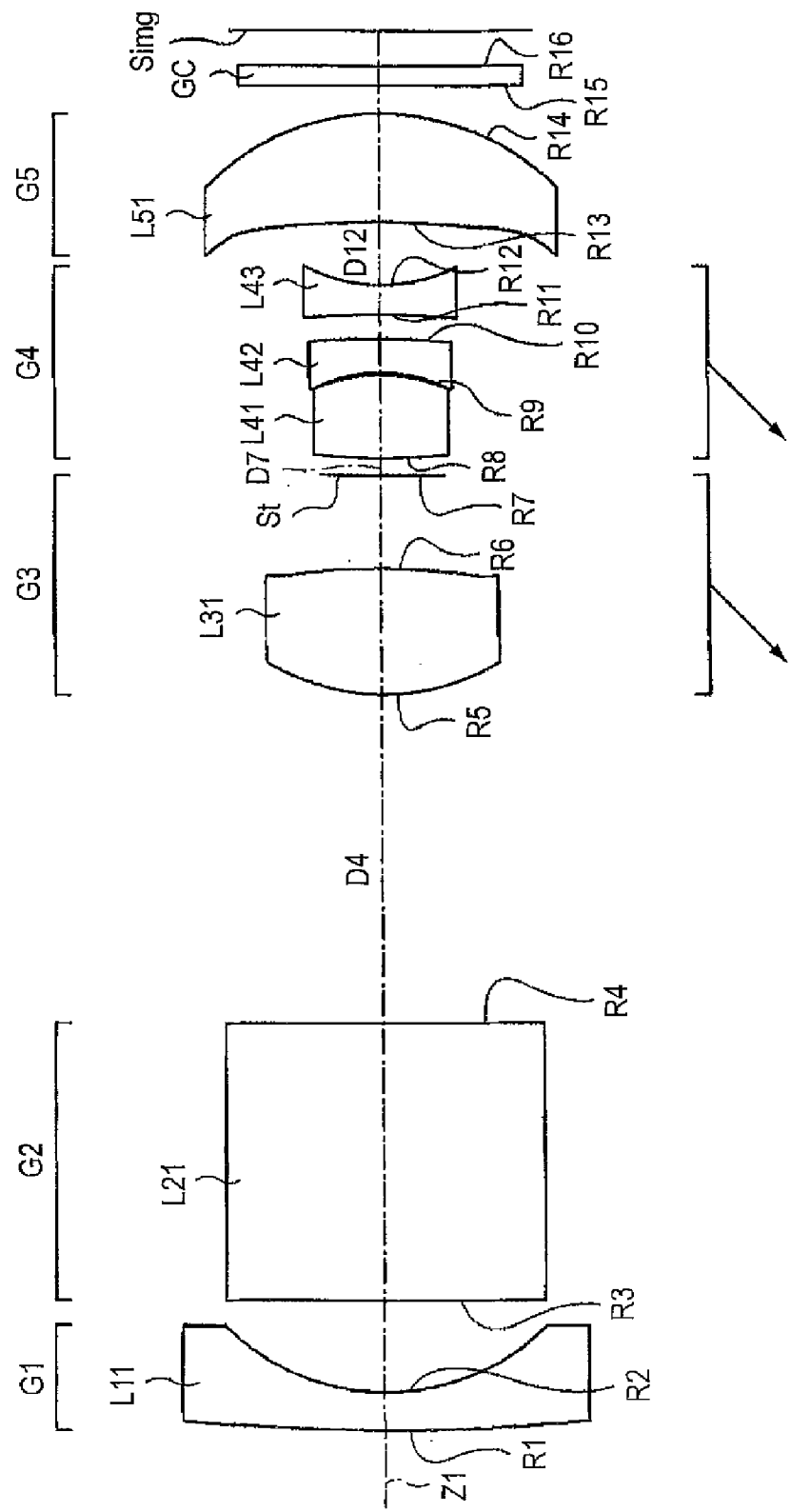
FIG. 6 shows a lens sectional view showing a sixth arrangement of a zoom lens according to the embodiment of the invention, corresponding to embodiment 6.

Likewise, FIGS. 14A and 14B show, as embodiment 6, the concrete lens data corresponding to the FIG. 6 zoom lens structure. The zoom lens of embodiment 6 is similar in basic arrangement to the zoom lens of embodiment 1.

Likewise, FIGS. 15A and 15B show, as embodiment 7, the concrete lens data corresponding to the FIG. 7 zoom lens structure. The zoom lens of embodiment 7 is formed with two spherical lenses (lenses L31, L32), as the lens elements in the third lens group G3. Because the third and fourth lens groups G3, G4 are axially moved upon varying the magnification, the values of surface separation D4, D9, D14 are variable at front and back of those groups. FIG. 15B shows data values of surface separation D4, D9, D14 at the wide and telephoto ends upon varying the magnification. The zoom lens of embodiment 7 is made aspheric in form at both surfaces S1, S2 of the negative lens L11 (first lens group G1), both surfaces S13, S14 of the negative lens L43 in the fourth lens group G4 and both surfaces S15, S16 of the positive lens L51 (fifth lens group G5). In the zoom lens of embodiment 7, the aspheric surfaces are represented by effectively using even-order coefficients $A_4, A_6, A_8, A_{10}$.

FIG. 16 collectively shows the values concerning the foregoing conditional expressions on each of the embodiments.

Figure 17A:
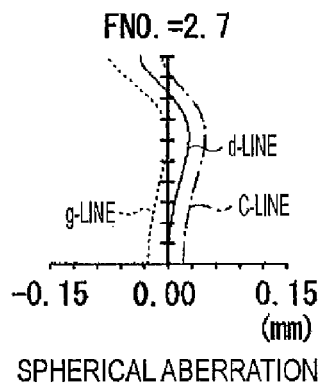
FIGS. 17A, 17B and 17C show an aberration diagram showing aberrations at the wide end, on the zoom lens of embodiment 1. Spherical aberration is shown in FIG. 17A, astigmatism is in FIG. 17B and distortion is in FIG. 17C.
Figure 17B:
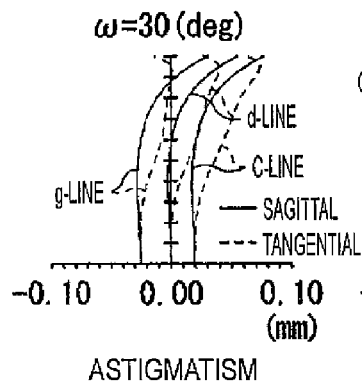
Figure 17C:
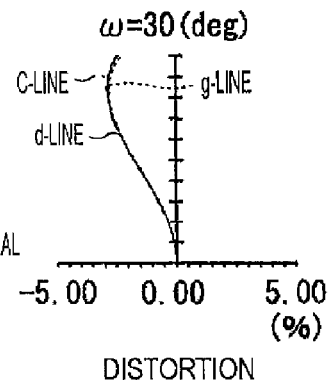
Figure 18A:
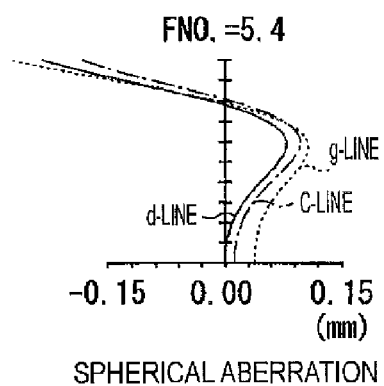
FIGS. 18A, 18B and 18C show an aberration diagram showing aberrations at the telephoto end, on the zoom lens of embodiment 1. Spherical aberration is shown in FIG. 18A, astigmatism is in FIG. 18B and distortion is in FIG. 18C.
Figure 18B:
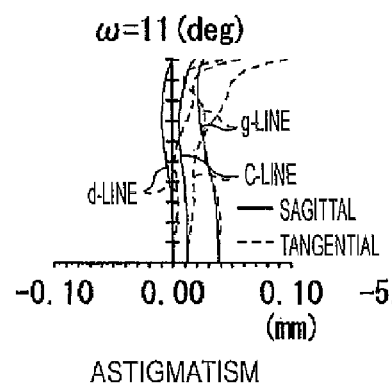
Figure 18C:
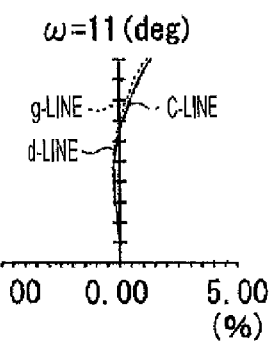

FIGS. 17A to 17C each show a spherical aberration, an astigmatism and a distortion (distortional aberration) at the wide end, on the zoom lens of embodiment 1. FIGS. 18A) to 18C each show similarly aberrations at the telephoto end. In each of the aberration diagrams, aberrations are also shown also at g-line (wavelength: 435.8 nm) and C-line (wavelength: 656.3 nm) by taking the d-line as reference wavelength. In the astigmatism diagrams, the solid line represents an aberration in the sagittal direction while the broken line an aberration in the tangential direction. FNo. represents an F value while ω a half of the angle of view.

Figure 19A:
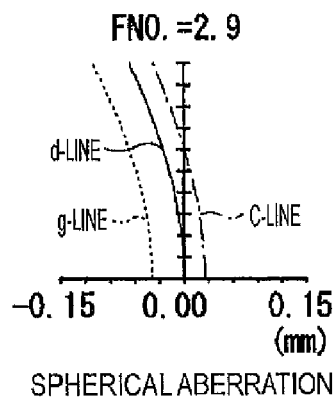
FIGS. 19A, 19B and 19C show an aberration diagram showing aberrations at the wide end, on the zoom lens of embodiment 2. Spherical aberration is shown in FIG. 19A, astigmatism is in FIG. 19B and distortion is in FIG. 19C.
Figure 19B:
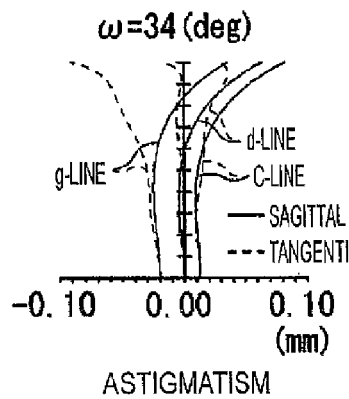
Figure 19C:
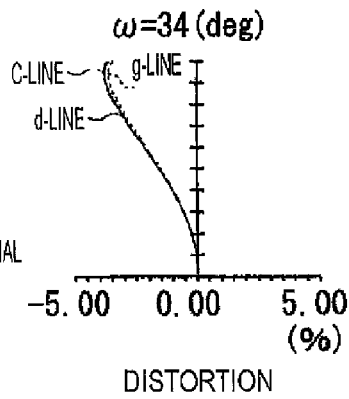
Figure 20A:
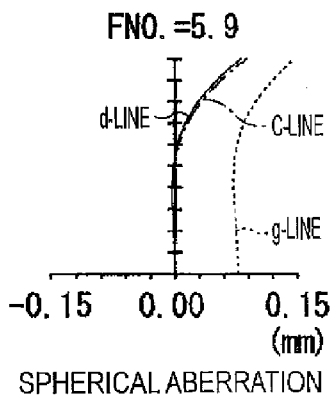
FIGS. 20A, 20B and 20C show an aberration diagram showing aberrations at the telephoto end, on the zoom lens of embodiment 2. Spherical aberration is shown in FIG. 20A, astigmatism is in FIG. 20B and distortion is in FIG. 20C.
Figure 20B:
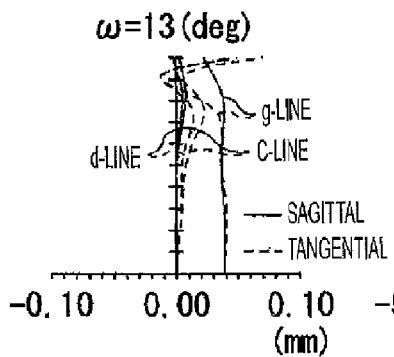
Figure 20C:
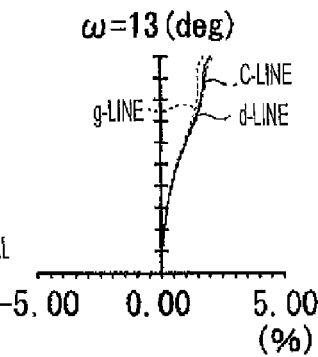
Figure 21A:
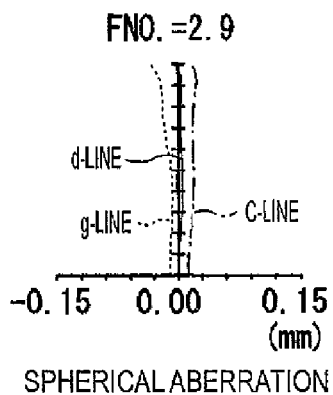
FIGS. 21A, 21B and 21C show an aberration diagram showing aberrations at the wide end, on the zoom lens of embodiment 3. Spherical aberration is shown in 21A, astigmatism is in 21B and distortion is in 21C.
Figure 21B:
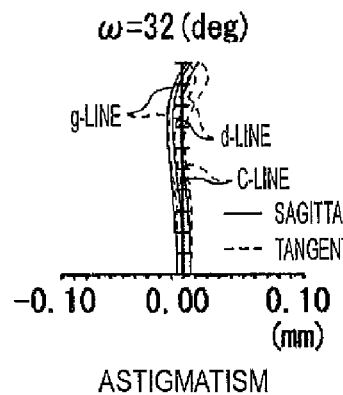
Figure 21C:
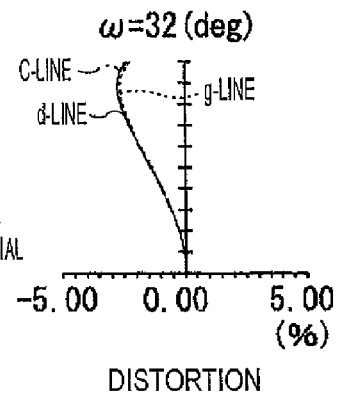
Figure 22A:
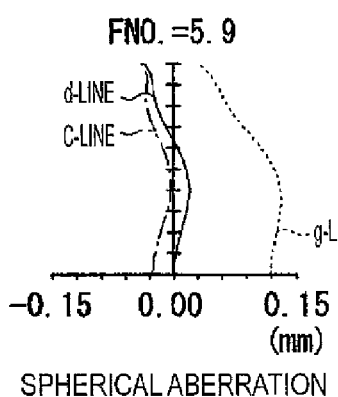
FIGS. 22A, 22B and 22C show an aberration diagram showing aberrations at the telephoto end, on the zoom lens of embodiment 3. Spherical aberration is shown in FIG. 22A, astigmatism is in FIG. 22B and distortion is in FIG. 22C.
Figure 22B:
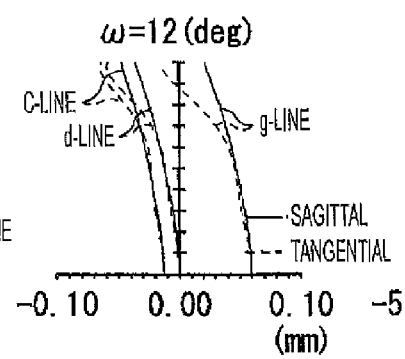
Figure 22C:
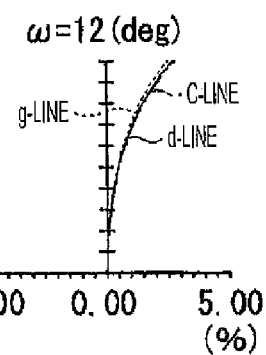
Figure 23A:
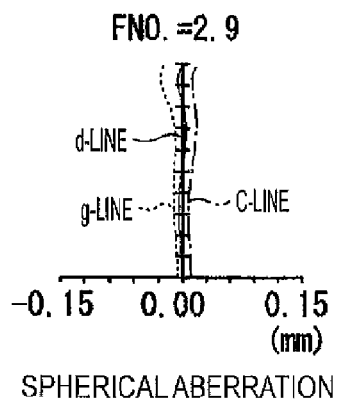
FIGS. 23A, 23B and 23C show an aberration diagram showing aberrations at the wide end, on the zoom lens of embodiment 4. Spherical aberration is shown in FIG. 23A, astigmatism is in FIG. 23B and distortion is in FIG. 23C.
Figure 23B:
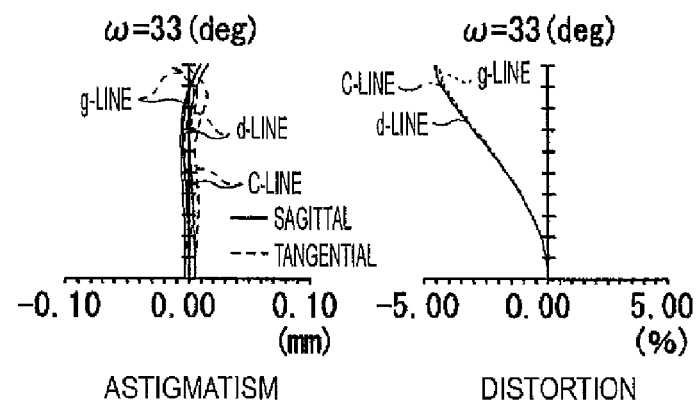
Figure 23C:
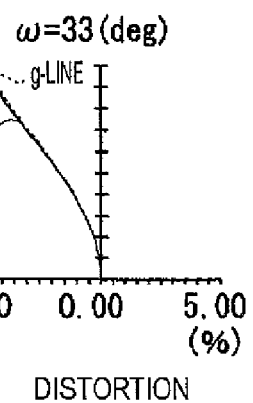
Figure 24A:
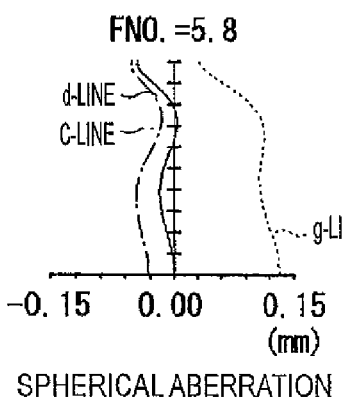
FIGS. 24A, 24B and 24C show an aberration diagram showing aberrations at the telephoto end, on the zoom lens of embodiment 4. Spherical aberration is shown in FIG. 24A, astigmatism is in FIG. 24B and distortion is in FIG. 24C.
Figure 24B:
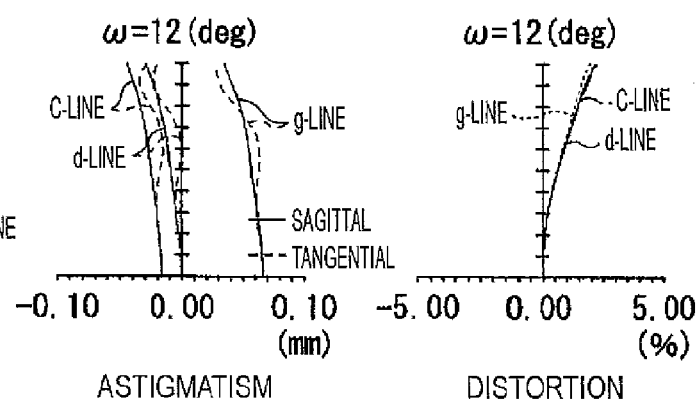
Figure 24C:
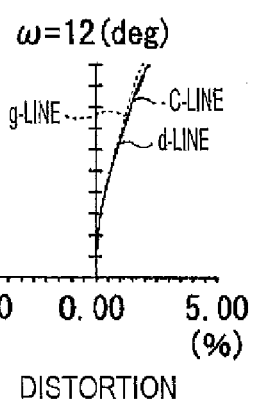
Figure 25A:
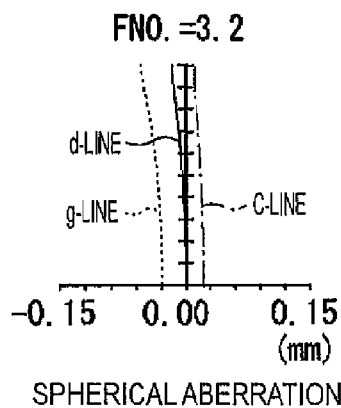
FIGS. 25A, 25B and 25C show an aberration diagram showing aberrations at the wide end, on the zoom lens of embodiment 5. Spherical aberration is shown in FIG. 25A, astigmatism is in FIG. 25B and distortion is in FIG. 25C.
Figure 25B:
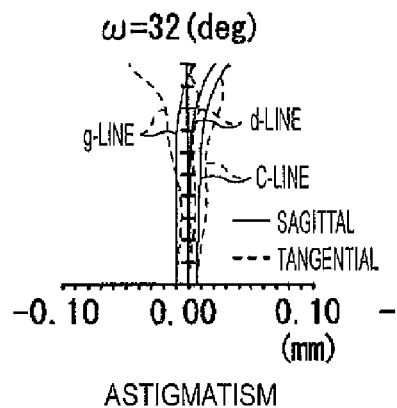
Figure 25C:
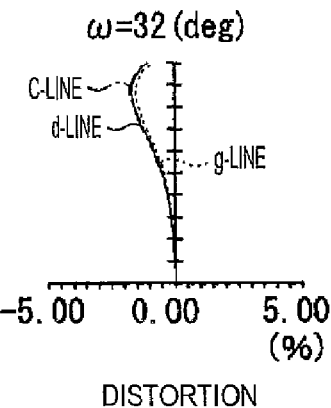
Figure 26A:
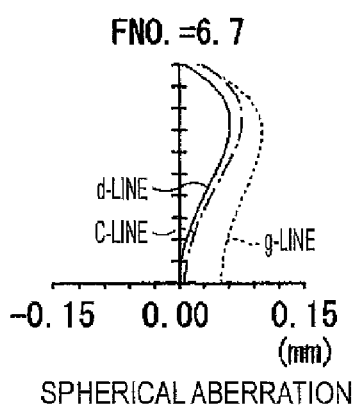
FIGS. 26A, 26B and 26C show an aberration diagram showing aberrations at the telephoto end, on the zoom lens of embodiment 5. Spherical aberration is shown in FIG. 26A, astigmatism is in FIG. 26B and distortion is in FIG. 26C.
Figure 26B:
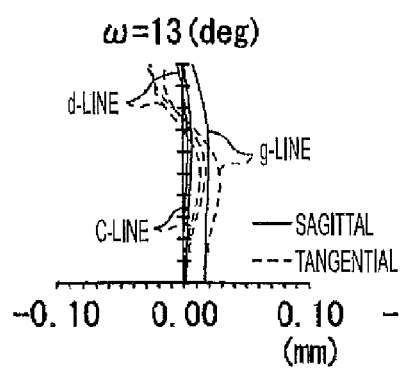
Figure 26C:
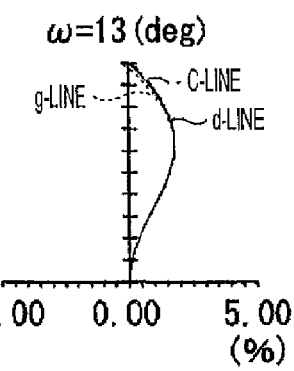
Figure 27A:
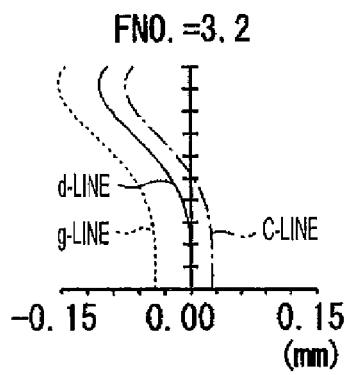
FIGS. 27A, 27B and 27C show an aberration diagram showing aberrations at the wide end, on the zoom lens of embodiment 6. Spherical aberration is shown in FIG. 27A, astigmatism is in FIG. 27B and distortion is in FIG. 27C.
Figure 27B:
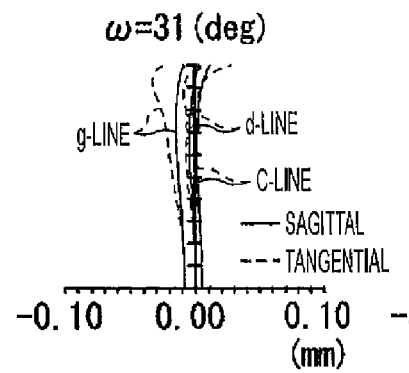
Figure 27C:
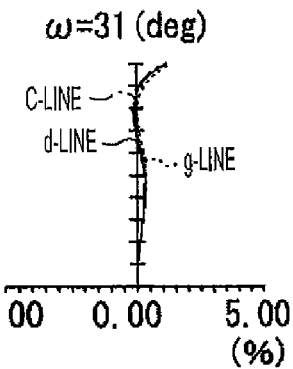
Figure 28A:
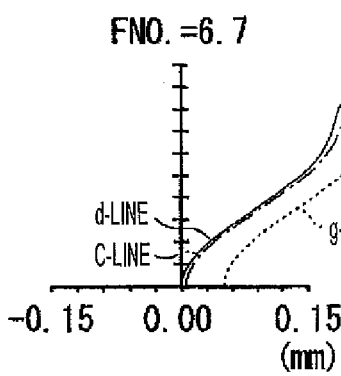
FIGS. 28A, 28B and 28C show an aberration diagram showing aberrations at the telephoto end, on the zoom lens of embodiment 6. Spherical aberration is shown in FIG. 28A, astigmatism is in FIG. 28B and distortion is in FIG. 28C.
Figure 28B:
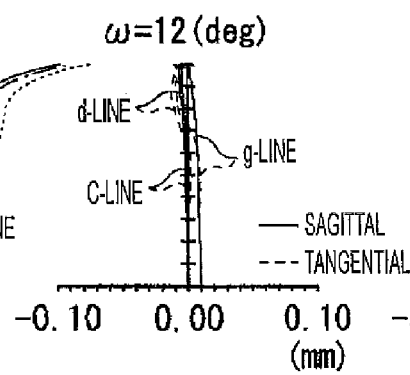
Figure 28C:
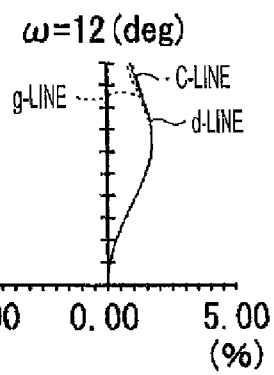
Figure 29A:
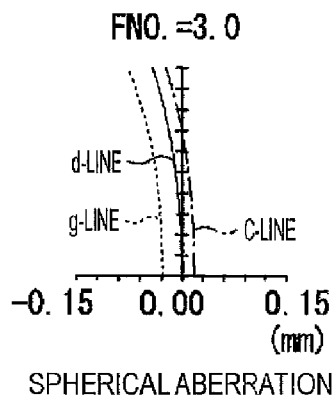
FIGS. 29A, 29B and 29C show an aberration diagram showing aberrations at the wide end, on the zoom lens of embodiment 7. Spherical aberration is shown in FIG. 29A, astigmatism is in FIG. 29B and distortion is in FIG. 29C.
Figure 29B:
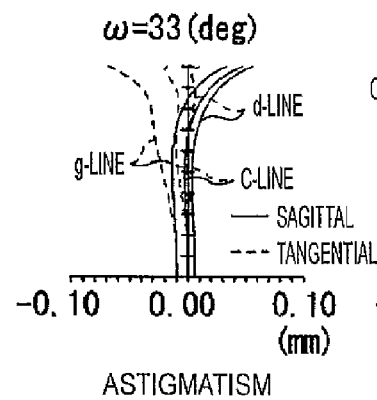
Figure 29C:
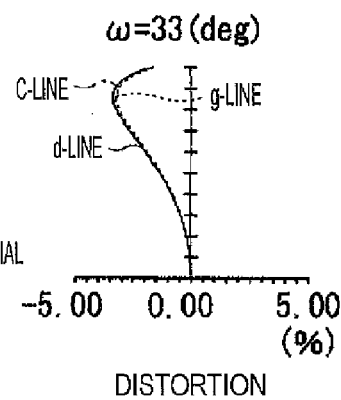
Figure 30A:
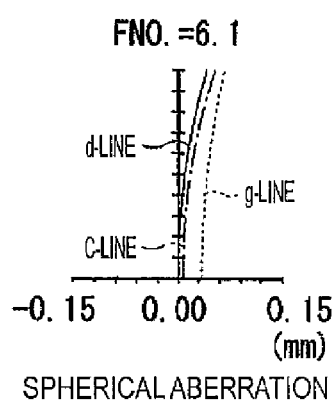
FIGS. 30A, 30B and 30C show an aberration diagram showing aberrations at the telephoto end, on the zoom lens of embodiment 7. Spherical aberration is shown in FIG. 30A, astigmatism is in FIG. 30B and distortion is in FIG. 30C.
Figure 30B:
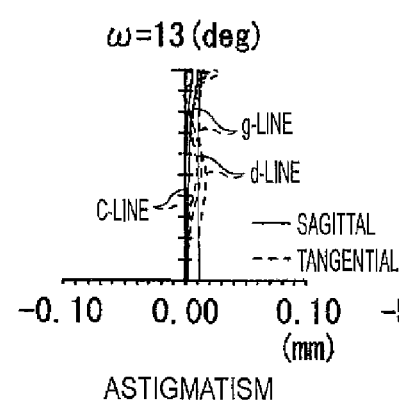
Figure 30C:
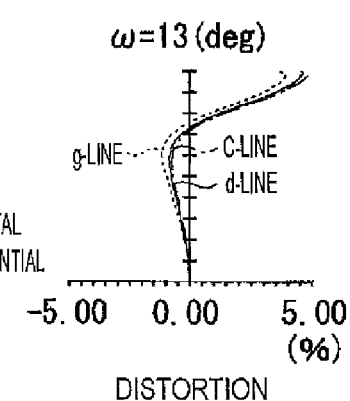

Likewise, FIGS. 19A to 19C show aberrations (at the wide end) on the zoom lens of embodiment 2 while FIGS. 20A to 20C show aberrations (at the telephoto end) thereon. Likewise, FIGS. 21A to 21C show aberrations (at the wide end) on the zoom lens of embodiment 3 while FIGS. 22A to 22C show aberrations (at the telephoto end) thereon. Likewise, FIGS. 23A to 23C show aberrations (at the wide end) on the zoom lens of embodiment 4 while FIGS. 24A to 24C show aberrations (at the telephoto end) thereon. Likewise, FIGS. 25A to 25C show aberrations (at the wide end) on the zoom lens of embodiment 5 while FIGS. 26A to 26C show aberrations (at the telephoto end) thereon. Likewise, FIGS. 27A to 27C show aberrations (at the wide end) on the zoom lens of embodiment 6 while FIGS. 28A to 28C show aberrations (at the telephoto end) thereon. Likewise, FIGS. 29A to 29C show aberrations (at the wide end) on the zoom lens of embodiment 7 while FIGS. 30A to 30C show aberrations (at the telephoto end) thereon.

As can be understood from the numerical data and aberration diagrams, a zoom lens is realized that is favorably corrected for aberrations and reduced in overall length as compared to the conventional bending type zoom lens, on each of the embodiments.

Incidentally, the invention is not limited to the foregoing embodiments but can be modified in various ways. For example, the lens components are not limited to the numerical embodiments, in respect of the values of curvature radius, surface separation and refractive index but can take other values.

What is claimed is:

1. A zoom lens comprising, in order from an object side:
   a first lens group that is fixed upon zooming and wholly has a negative refractive power;
   a second lens group that comprises an optical path bending prism, the second lens group which is fixed upon zooming;
   a third lens group that is allowed to move upon zooming and wholly has a positive refractive power;
   a fourth lens group that is allowed to move upon zooming and wholly has a negative refractive power; and
   a fifth lens group that is fixed upon zooming and wholly has a positive refractive power,
   wherein the following Conditional Expressions (1) to (2) are satisfied:

$$-1.5 < f3/f4 < -0.5 \quad (1)$$

$$2.0 < DA/f_w < 3.0 \quad (2)$$

where
   f3 denotes focal length of the third lens group,
   f4 denotes focal length of the fourth lens group,
   $f_w$ denotes focal length of a system overall at a wide end, and
   DA denotes optical path length from an image-side surface of the first lens group to an object-side surface of the third lens group, at a telephoto end.

2. The zoom lens of claim 1,
   wherein the first lens group comprises a negative aspheric lens having a concave surface directed toward an image side,
   the third lens group comprises at least a positive lens having a convex surface directed toward the object side,
   the fourth lens group comprises at least a negative lens having a concave surface directed toward the image side, and
   the fifth lens group comprises a positive aspheric lens having a convex surface directed toward the image side.

3. The zoom lens of claim 1,
   wherein further satisfying the following Conditional Expression (3):

$$50 < vG3 \quad (3)$$

where
vG3: mean value of Abbe numbers at d-line over lenses in the third lens group.

4. The zoom lens of claim 1,
wherein the fourth lens group comprises a cemented lens that includes two lenses; and a negative lens having a concave surface directed toward the image side.

5. The zoom lens of claim 1,
wherein the fourth lens group comprises (i) a cemented lens that includes a positive lens and a first negative lens, and (ii) a second negative lens, and
wherein the first negative lens has a concave surface directed toward the image side.

6. The zoom lens in claim 1,
wherein the third lens group comprises two spherical lenses.

7. The zoom lens in claim 1,
wherein the third lens group comprises (i) a positive aspheric lens at both surfaces, the positive aspheric lens having a convex surface directed toward the object side and (ii) a spherical lens.

8. The zoom lens of claim 1,
wherein the first lens group comprises a negative aspheric lens having a concave surface directed toward an image side,
the third lens group comprises at least a positive lens having a convex surface directed toward the object side,
the fourth lens group comprises at least a negative lens having a concave surface directed toward the image side, and
the fifth lens group comprises a positive aspheric lens having a convex surface directed toward the image side.

9. A zoom lens comprising, in order from an object side:
a first lens group that is fixed upon zooming and wholly has a negative refractive power;
a second lens group that comprises an optical path bending prism, the second lens group which is fixed upon zooming;
a third lens group that is allowed to move upon zooming and wholly has a positive refractive power;
a fourth lens group that is allowed to move upon zooming and wholly has a negative refractive power, wherein the fourth lens group includes at least two lenses; and
a fifth lens group that is fixed upon zooming and wholly has a positive refractive power.

10. The zoom lens of claim 9,
wherein the first lens group comprises a negative aspheric lens having a concave surface directed toward an image side,
the third lens group comprises at least a positive lens having a convex surface directed toward the object side,
the fourth lens group comprises at least a negative lens having a concave surface directed toward the image side, and
the fifth lens group comprises a positive aspheric lens having a convex surface directed toward the image side.

11. The zoom lens of claim 9,
wherein the fourth lens group comprises a cemented lens that includes two lenses; and a negative lens having a concave surface directed toward the image side.

12. A zoom lens comprising, in order from an object side:
a first lens group that is fixed upon zooming and wholly has a negative refractive power;
a second lens group that comprises an optical path bending prism, the second lens group which is fixed upon zooming;
a third lens group that is allowed to move upon zooming and wholly has a positive refractive power;
a fourth lens group that is allowed to move upon zooming and wholly has a negative refractive power; and
a fifth lens group that is fixed upon zooming and wholly has a positive refractive power,
wherein the following Conditional Expression (3) is satisfied:

$$50 < vG3 \qquad (3)$$

where
vG3: mean value of Abbe numbers at d-line over lenses in the third lens group.

13. The zoom lens of claim 12,
wherein the first lens group comprises a negative aspheric lens having a concave surface directed toward an image side,
the third lens group comprises at least a positive lens having a convex surface directed toward the object side,
the fourth lens group comprises at least a negative lens having a concave surface directed toward the image side, and
the fifth lens group comprises a positive aspheric lens having a convex surface directed toward the image side.

14. The zoom lens of claim 12,
wherein the fourth lens group comprises a cemented lens that includes two lenses; and a negative lens having a concave surface directed toward the image side.

* * * * *